United States Patent
Koo et al.

(10) Patent No.: US 10,979,736 B2
(45) Date of Patent: Apr. 13, 2021

(54) METHOD AND APPARATUS FOR PERFORMING LOW-COMPLEXITY COMPUTATION OF TRANSFORM KERNEL FOR VIDEO COMPRESSION

(71) Applicants: LG ELECTRONICS INC., Seoul (KR); INDUSTRY-ACADEMIC COOPERATION FOUNDATION, CHOSUN UNIVERSITY, Gwangju (KR)

(72) Inventors: Moonmo Koo, Seoul (KR); Jaehyun Lim, Seoul (KR); Bumshik Lee, Gwangju (KR)

(73) Assignees: LG ELECTRONICS INC., Seoul (KR); INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 0 days.

(21) Appl. No.: 16/620,438

(22) PCT Filed: Jun. 8, 2018

(86) PCT No.: PCT/KR2018/006538
§ 371 (c)(1),
(2) Date: Dec. 6, 2019

(87) PCT Pub. No.: WO2018/226067
PCT Pub. Date: Dec. 13, 2018

(65) Prior Publication Data
US 2020/0213621 A1    Jul. 2, 2020

Related U.S. Application Data

(60) Provisional application No. 62/517,098, filed on Jun. 8, 2017, provisional application No. 62/517,099, filed
(Continued)

(51) Int. Cl.
H04N 19/61        (2014.01)
H04N 19/176       (2014.01)
H04N 19/625       (2014.01)

(52) U.S. Cl.
CPC .......... *H04N 19/61* (2014.11); *H04N 19/176* (2014.11); *H04N 19/625* (2014.11)

(58) Field of Classification Search
CPC ...... H04N 19/61; H04N 19/176; H04N 19/44; H04N 19/625; H04N 19/70
(Continued)

(56) References Cited

U.S. PATENT DOCUMENTS

| 10,405,000 B2* | 9/2019 | Kao ..................... H04N 19/129 |
| 2012/0057630 A1* | 3/2012 | Saxena ................ H04N 19/176 |
| | | 375/240.03 |
| 2012/0307893 A1* | 12/2012 | Reznik ................ G10L 19/0212 |
| | | 375/240.12 |
| 2013/0114730 A1* | 5/2013 | Joshi .................... H04N 19/436 |
| | | 375/240.18 |

(Continued)

FOREIGN PATENT DOCUMENTS

KR    10-2012-0046725 A    5/2012
KR    10-2014-0119823 A    10/2014
(Continued)

*Primary Examiner* — Christopher S Kelley
*Assistant Examiner* — Kathleen M Walsh
(74) *Attorney, Agent, or Firm* — Dentons US LLP

(57) ABSTRACT

The present disclosure provides a method for processing a video signal by using a linear relationship between transform types, the method comprising the steps of: determining a transform group on the basis of a prediction mode of a current block; parsing a transform combination index from the video signal, wherein the transform combination index indicates one of a plurality of transform combinations in the transform group; deriving a transform combination corresponding to the transform combination index, wherein the transform combination includes a horizontal transform and a vertical transform and includes DST-1 or DCT-5; performing inverse transform of the current block on the basis of the
(Continued)

transform combination; and reconstructing the video signal by using the inverse-transformed current block.

8 Claims, 19 Drawing Sheets

Related U.S. Application Data on Jun. 8, 2017, provisional application No. 62/611,546, filed on Dec. 29, 2017, provisional application No. 62/611,547, filed on Dec. 29, 2017.

(58) Field of Classification Search
USPC .................................................. 375/240.18
See application file for complete search history.

(56) References Cited

U.S. PATENT DOCUMENTS

| | | | |
|---|---|---|---|
| 2016/0219290 A1* | 7/2016 | Zhao | H04N 19/109 |
| 2017/0188029 A1* | 6/2017 | An | H04N 19/157 |
| 2018/0020218 A1* | 1/2018 | Zhao | H04N 19/176 |
| 2018/0041776 A1* | 2/2018 | Kim | H04N 19/157 |
| 2019/0052876 A1* | 2/2019 | Lee | H04N 19/136 |
| 2020/0213626 A1* | 7/2020 | Ikai | H04N 19/45 |

FOREIGN PATENT DOCUMENTS

| | | |
|---|---|---|
| WO | 2015/172694 A1 | 11/2015 |
| WO | 2016/143991 A1 | 9/2016 |

* cited by examiner

[FIG. 1]
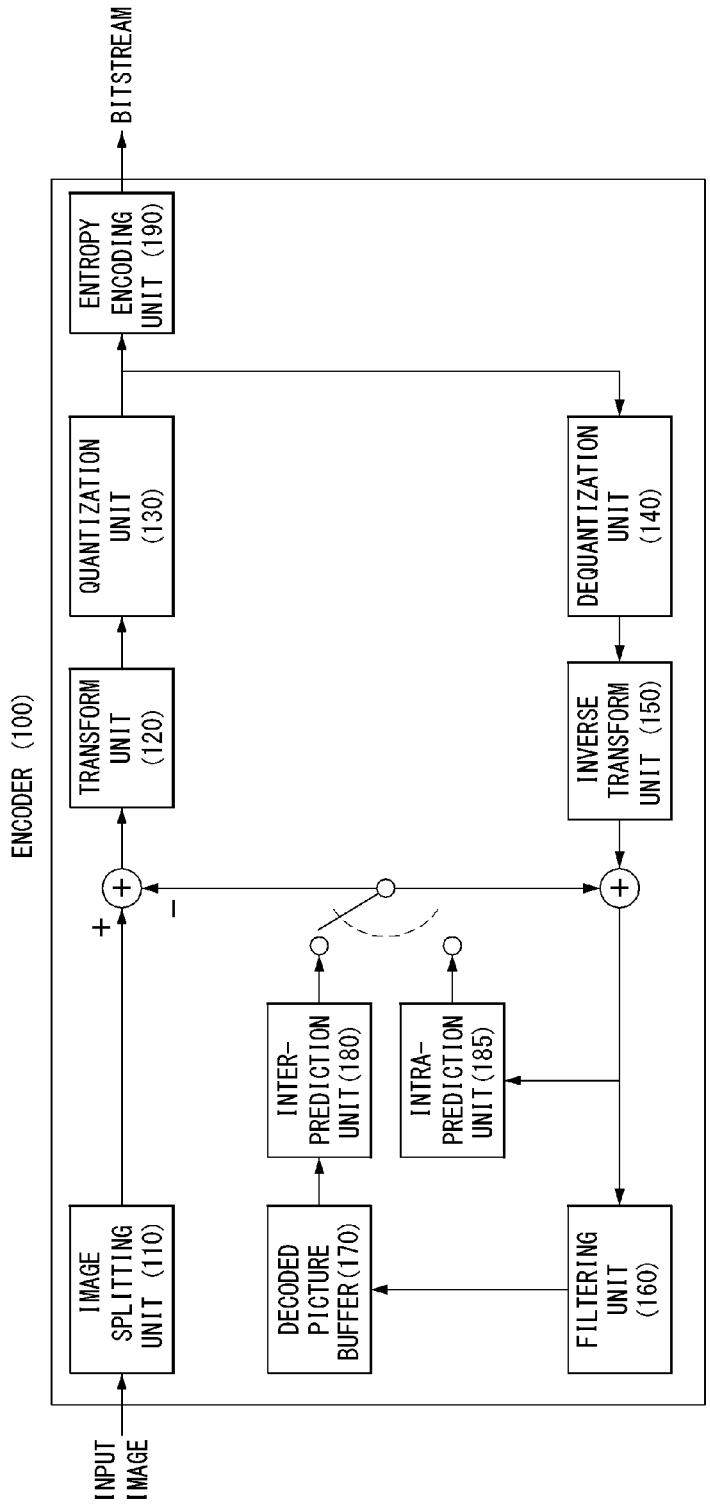

[FIG. 2]
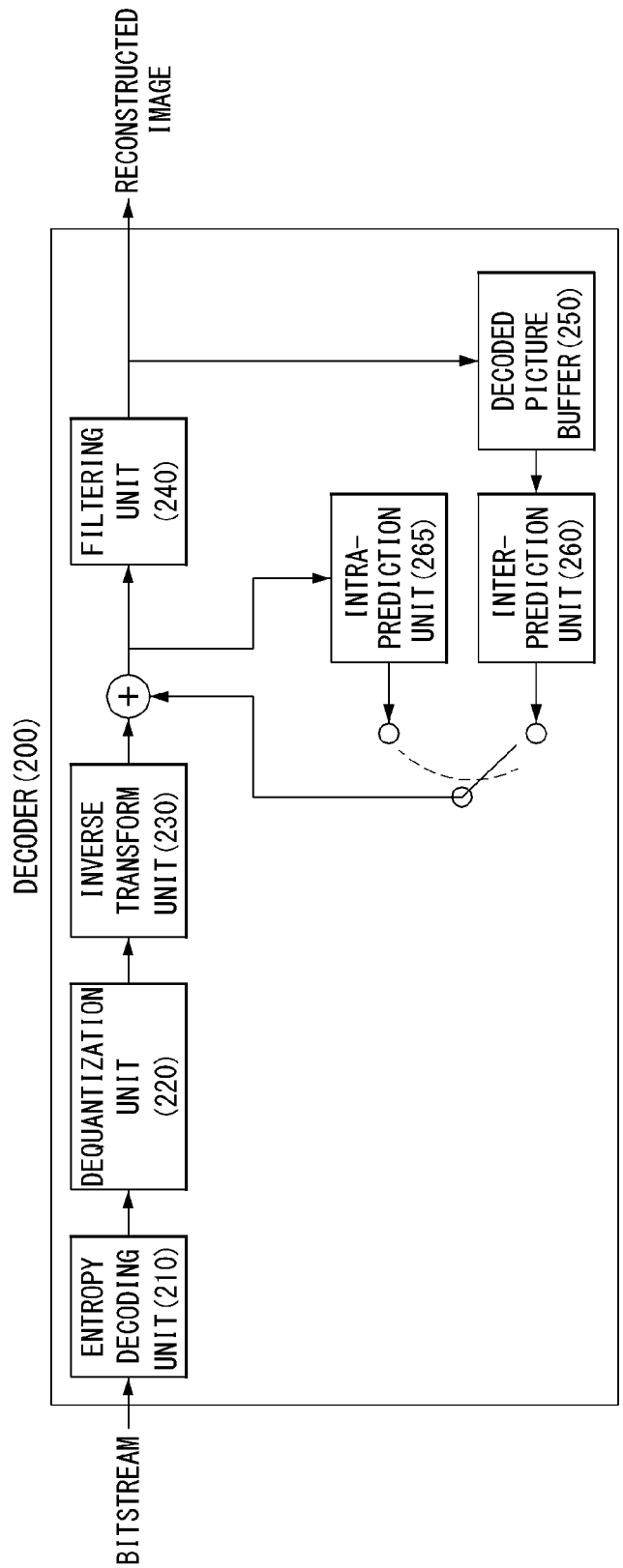

[FIG. 3]

| Configuration group | | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[FIG. 4]
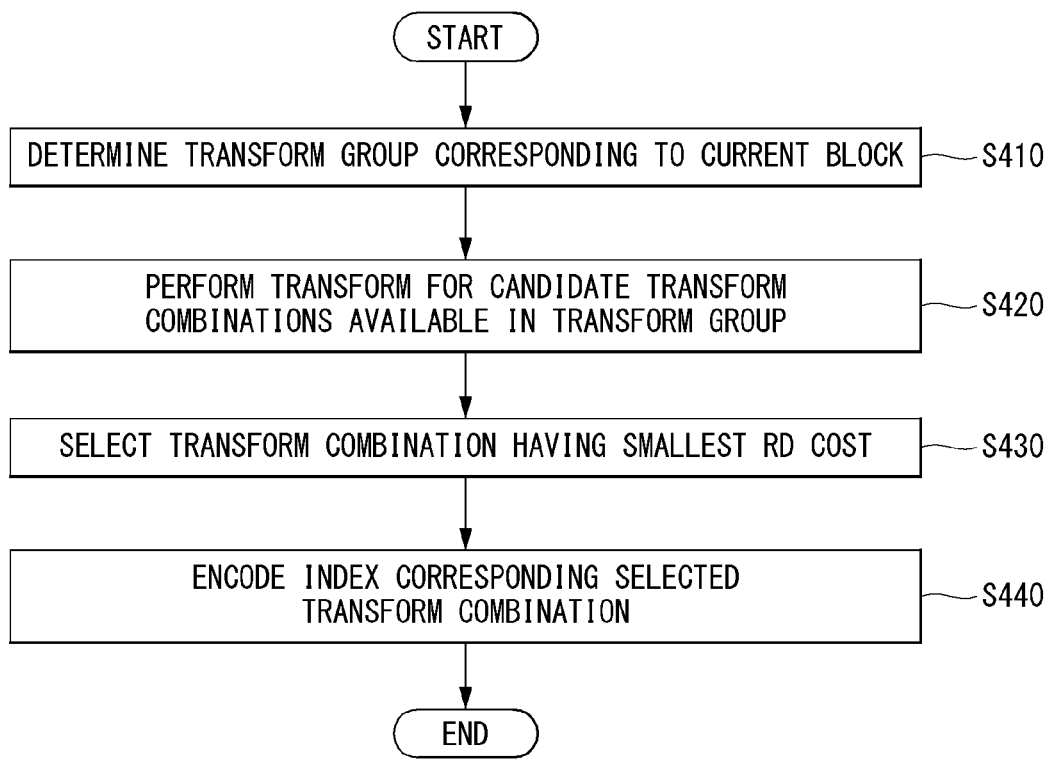

[FIG. 5]
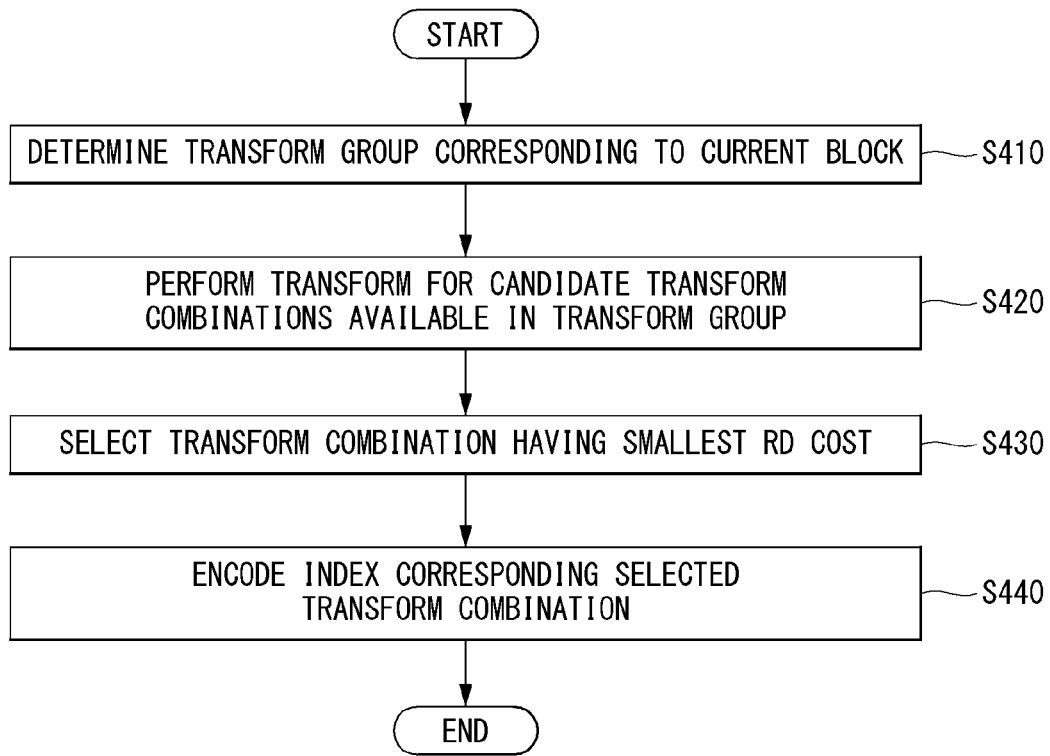
[FIG. 6]
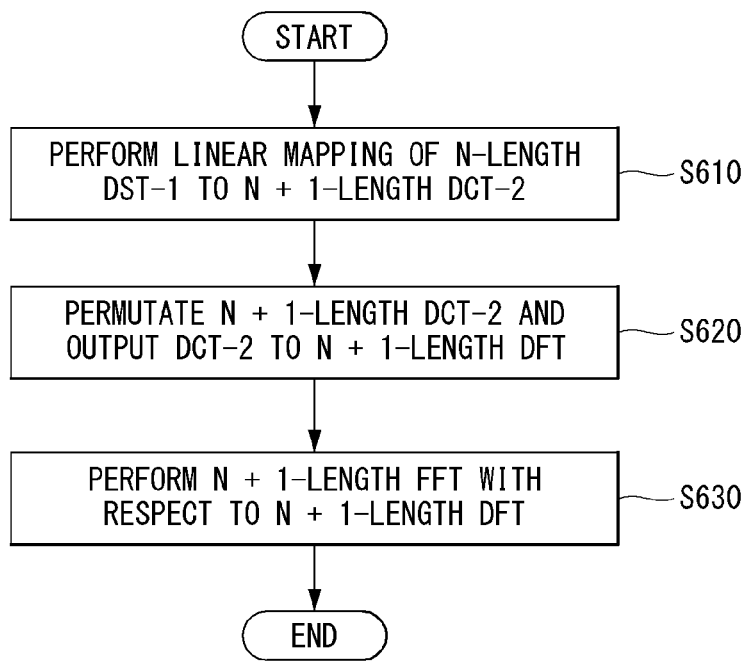

[FIG. 7]
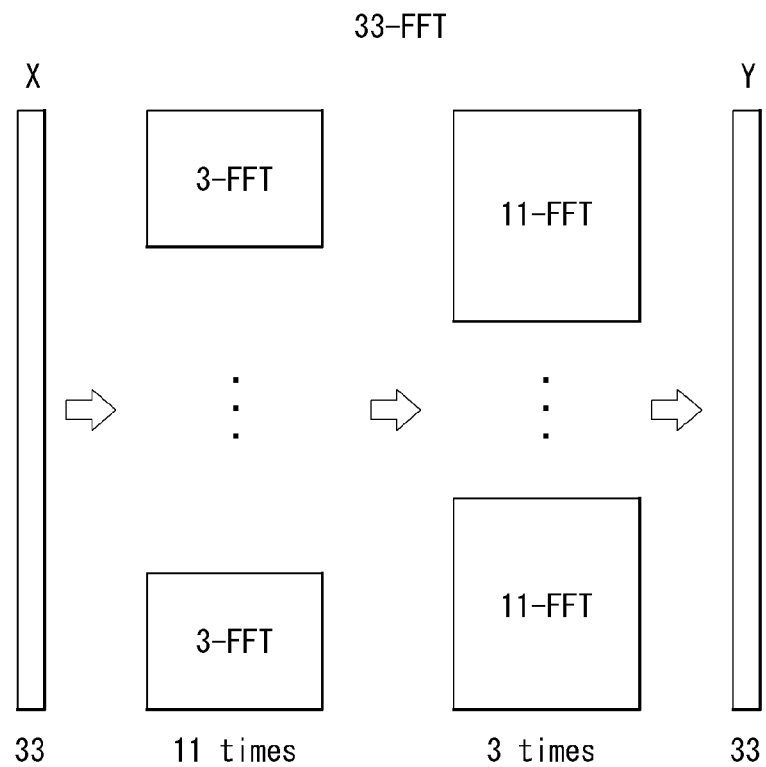

[FIG. 8]
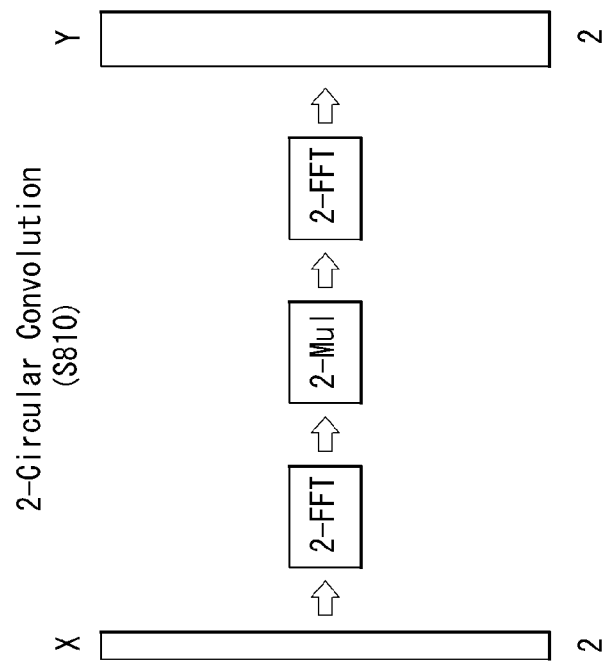
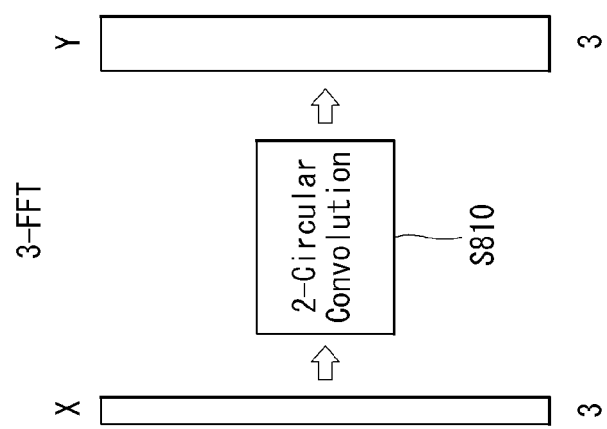

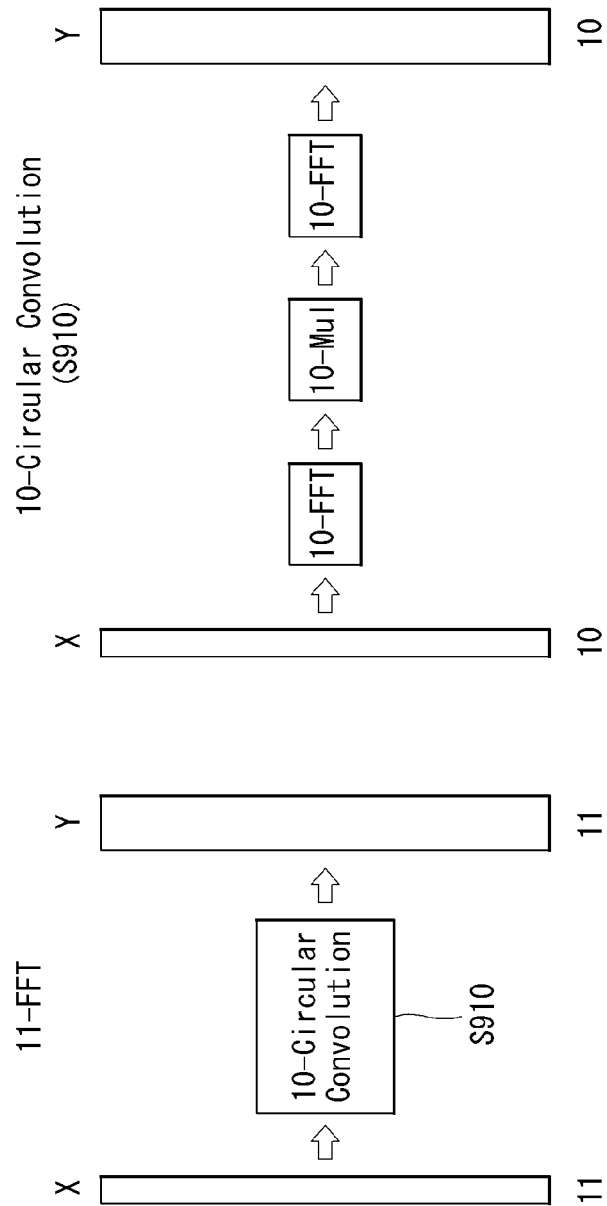

[FIG. 10]
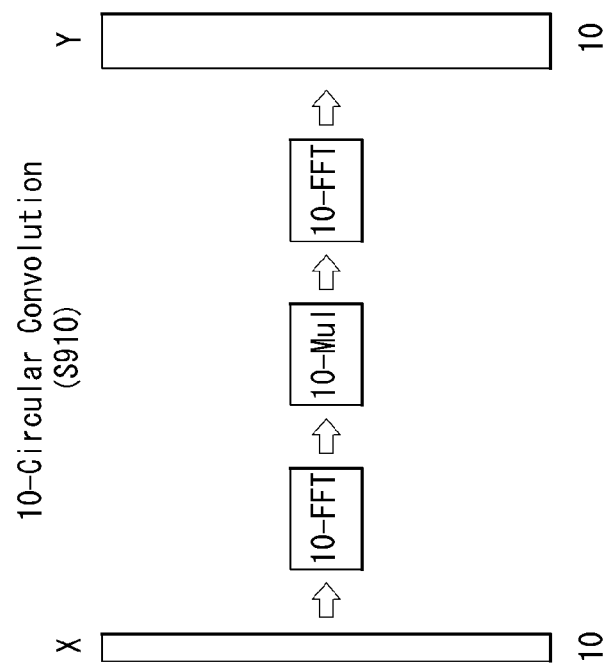
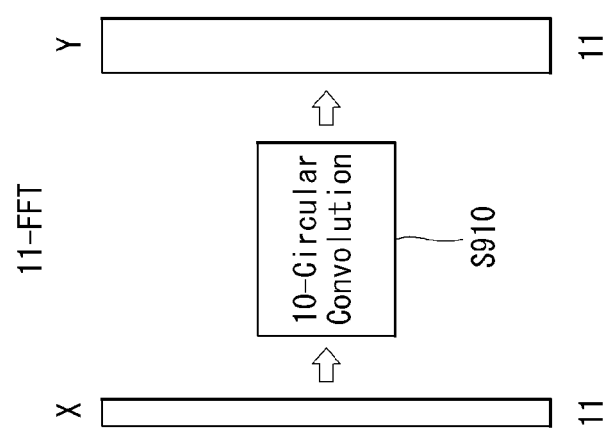

[FIG 11]
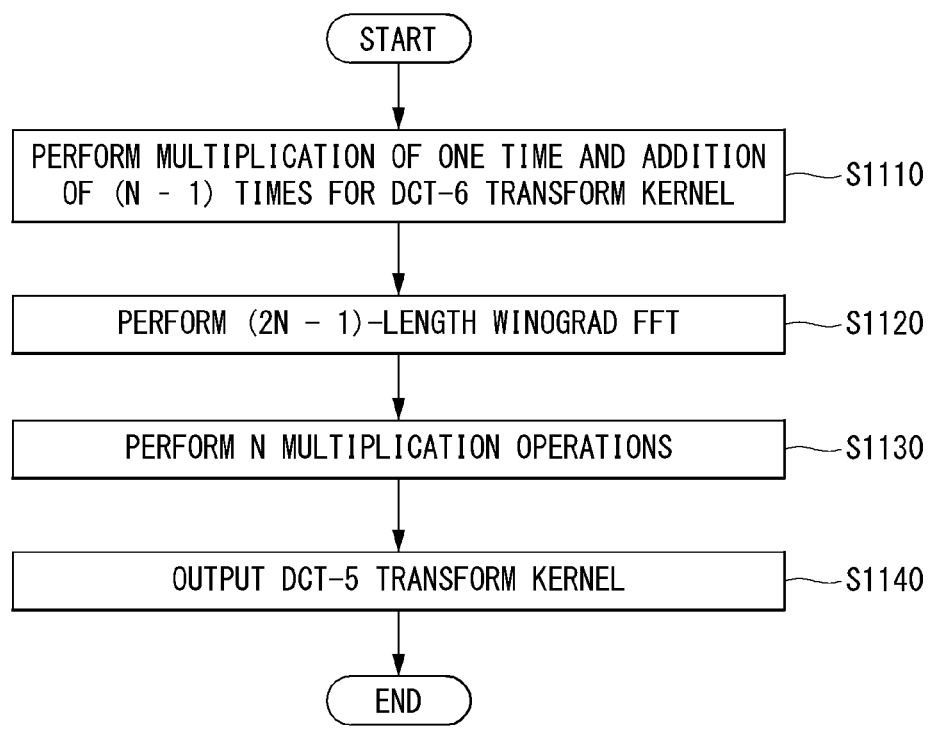

[FIG. 12]
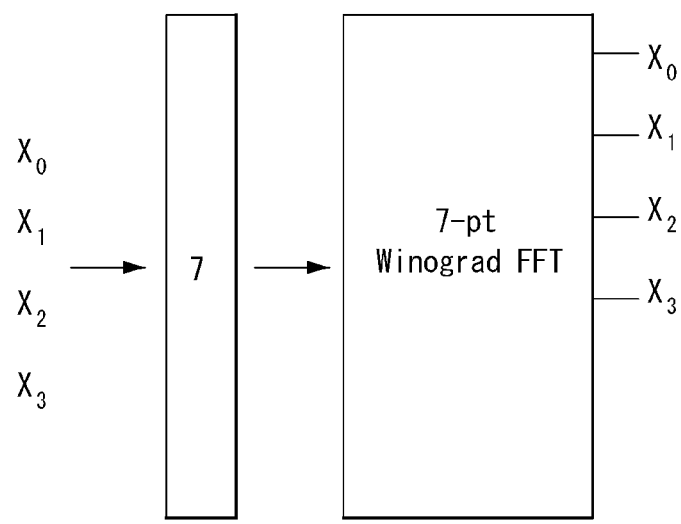

[FIG. 13]
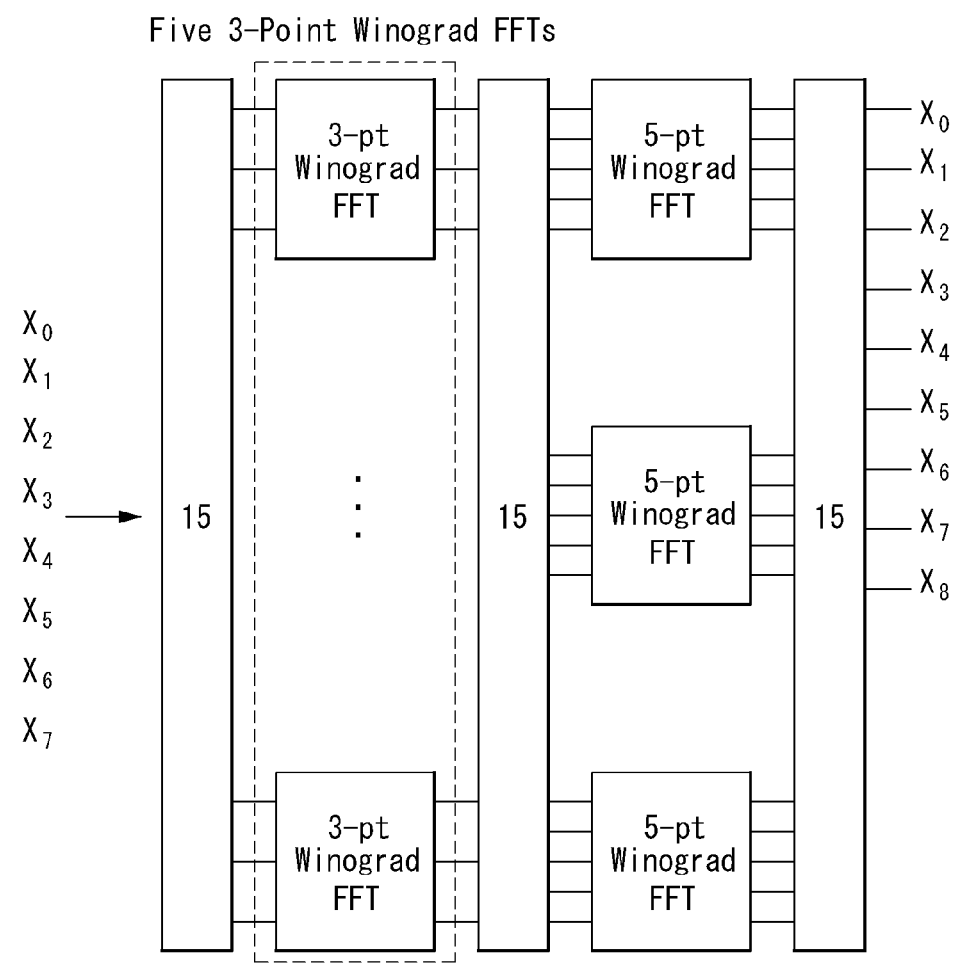

[FIG. 14]
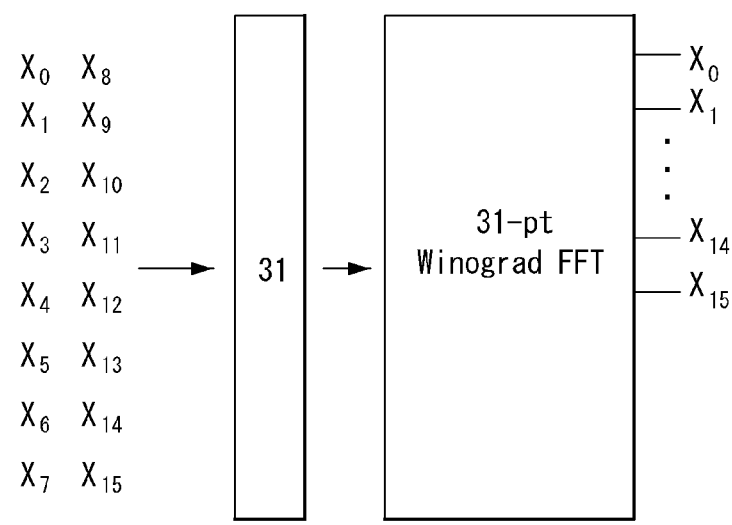

[FIG. 15]
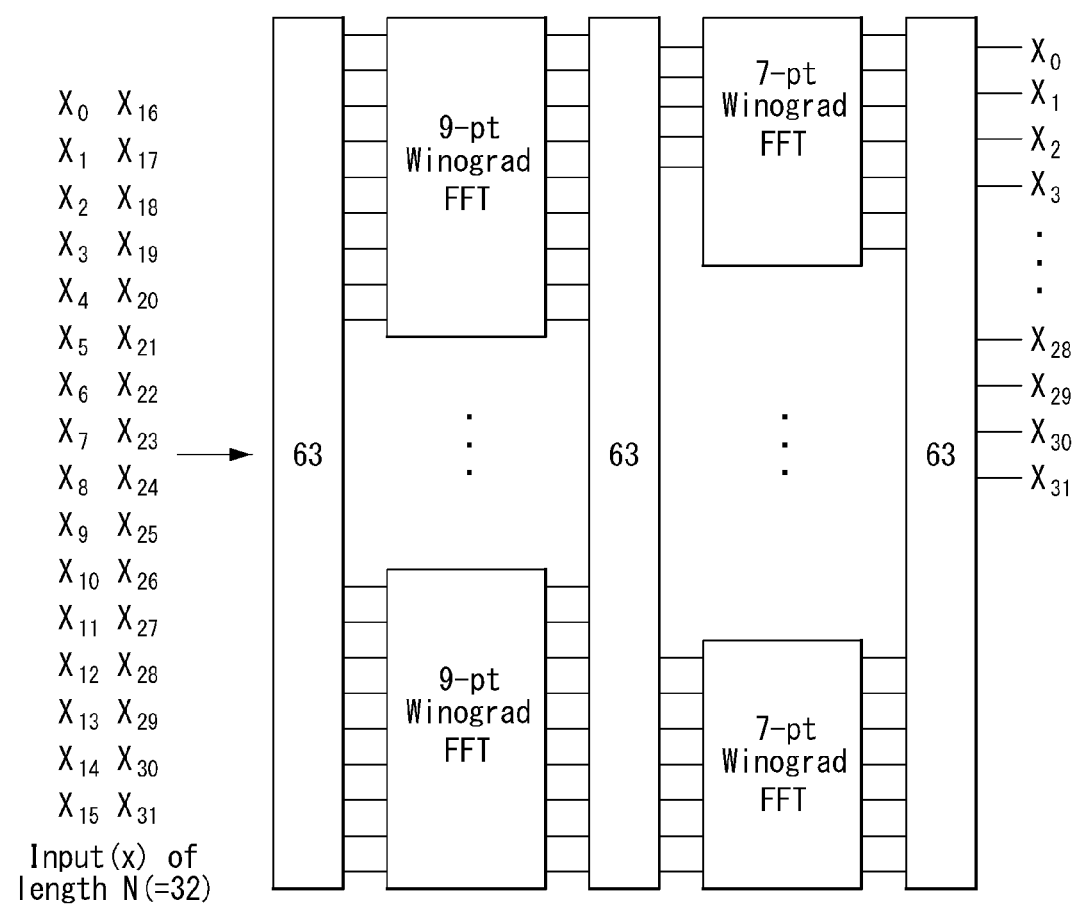

[FIG. 16]
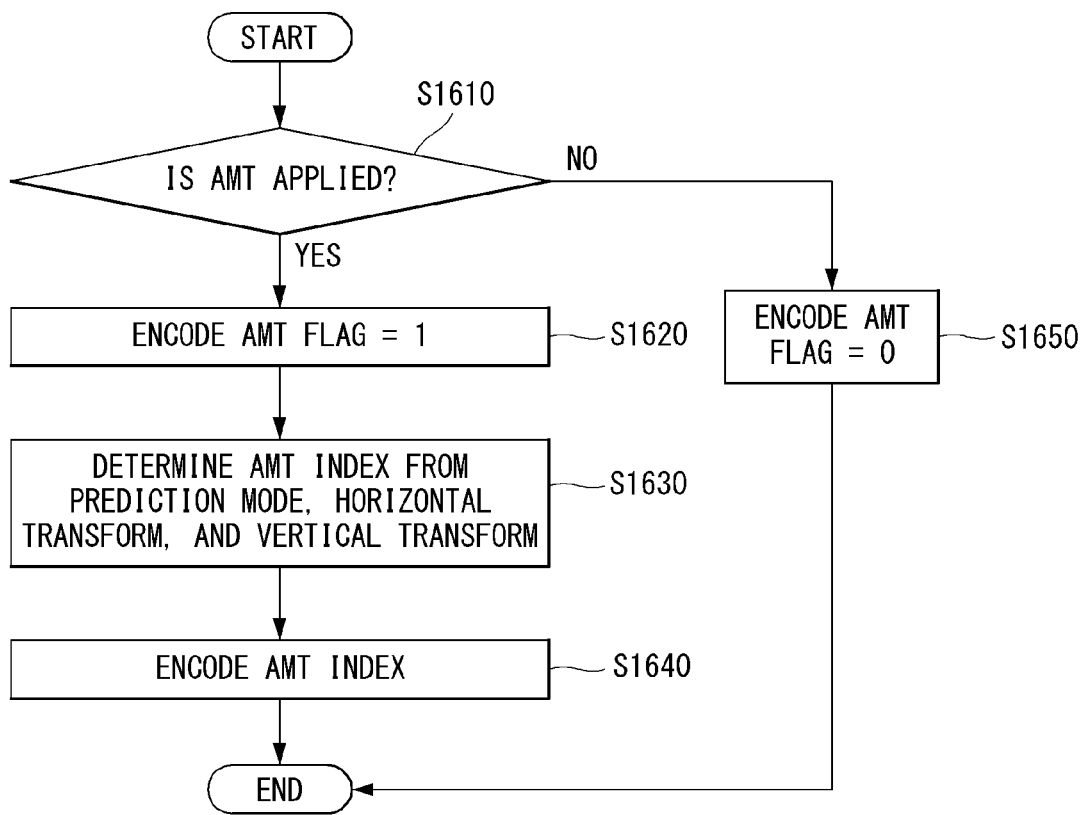

[FIG. 17]
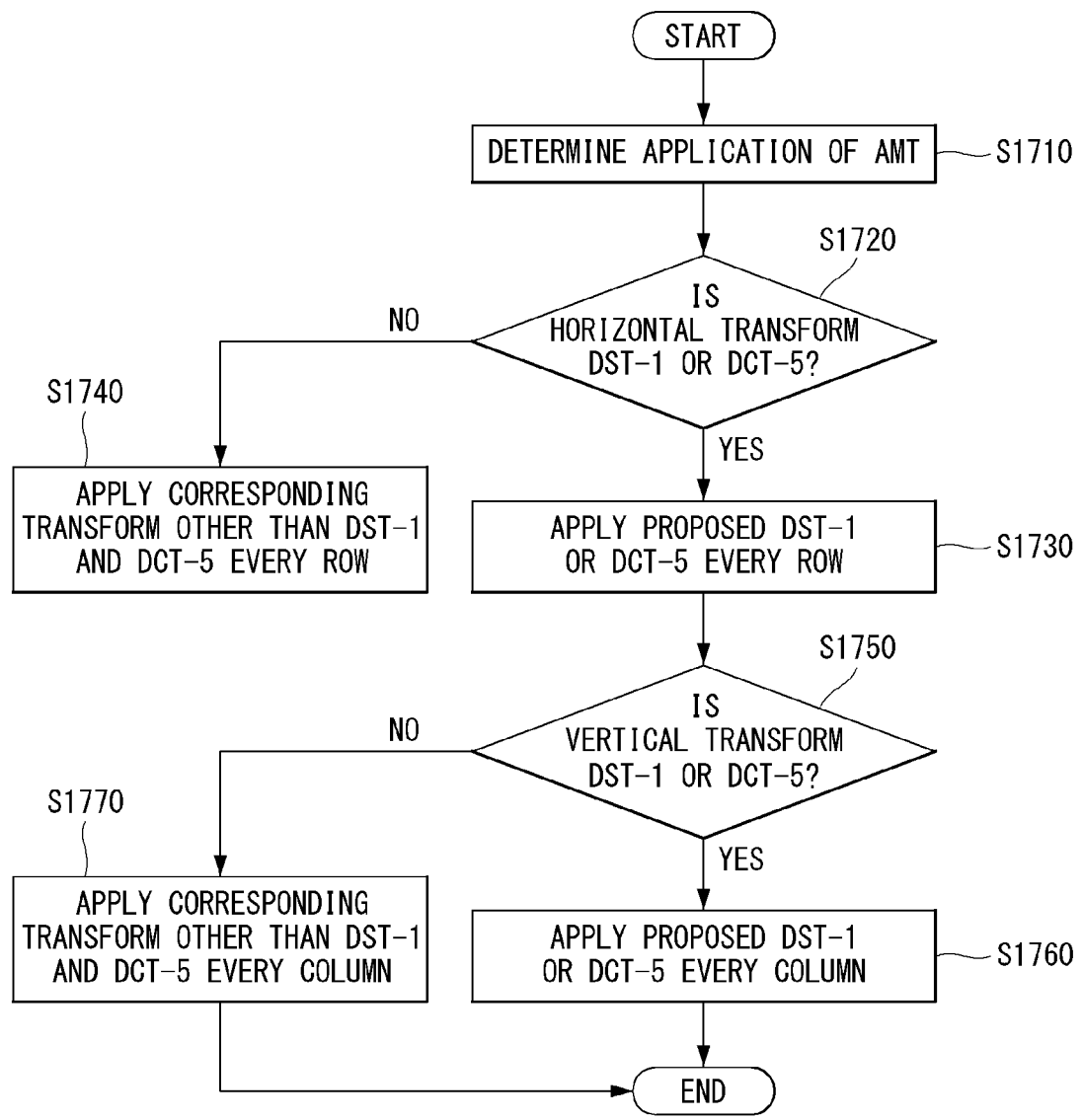

[FIG. 18]
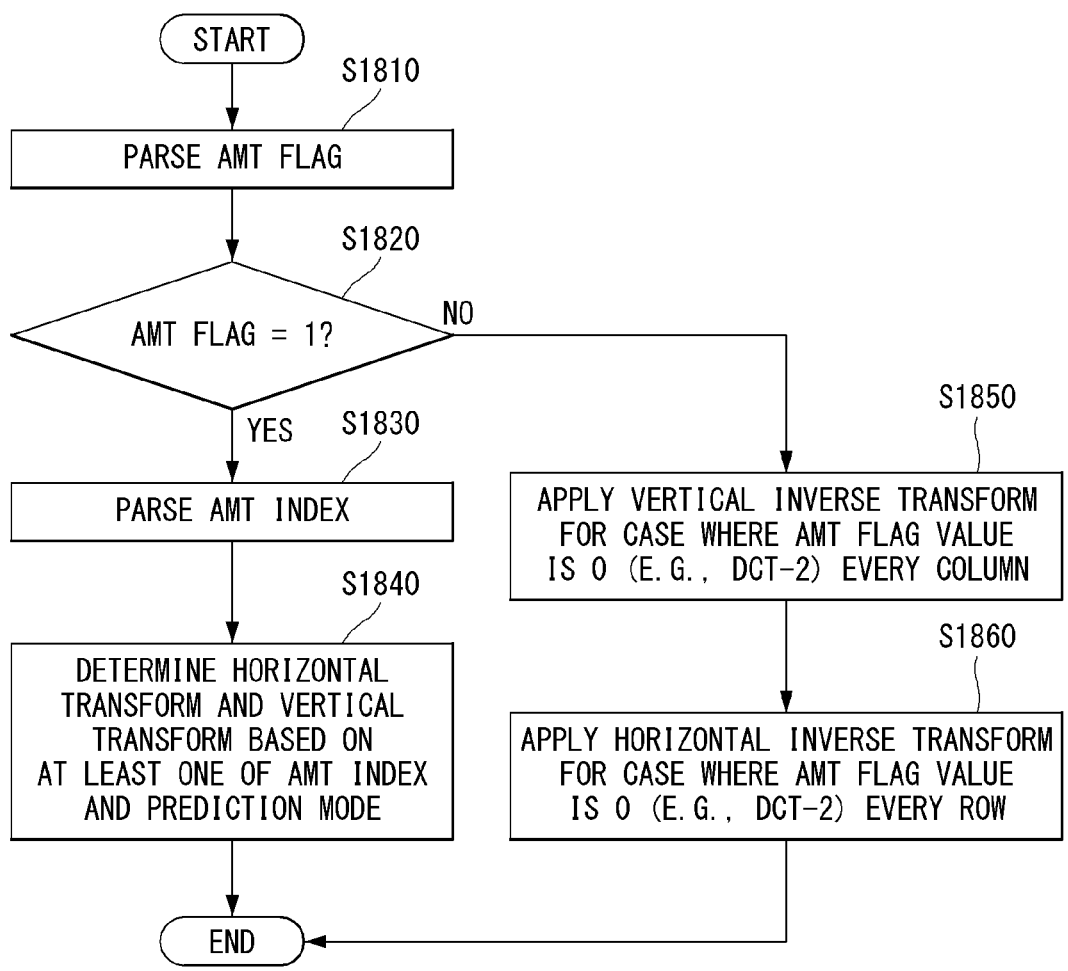

[FIG. 19]
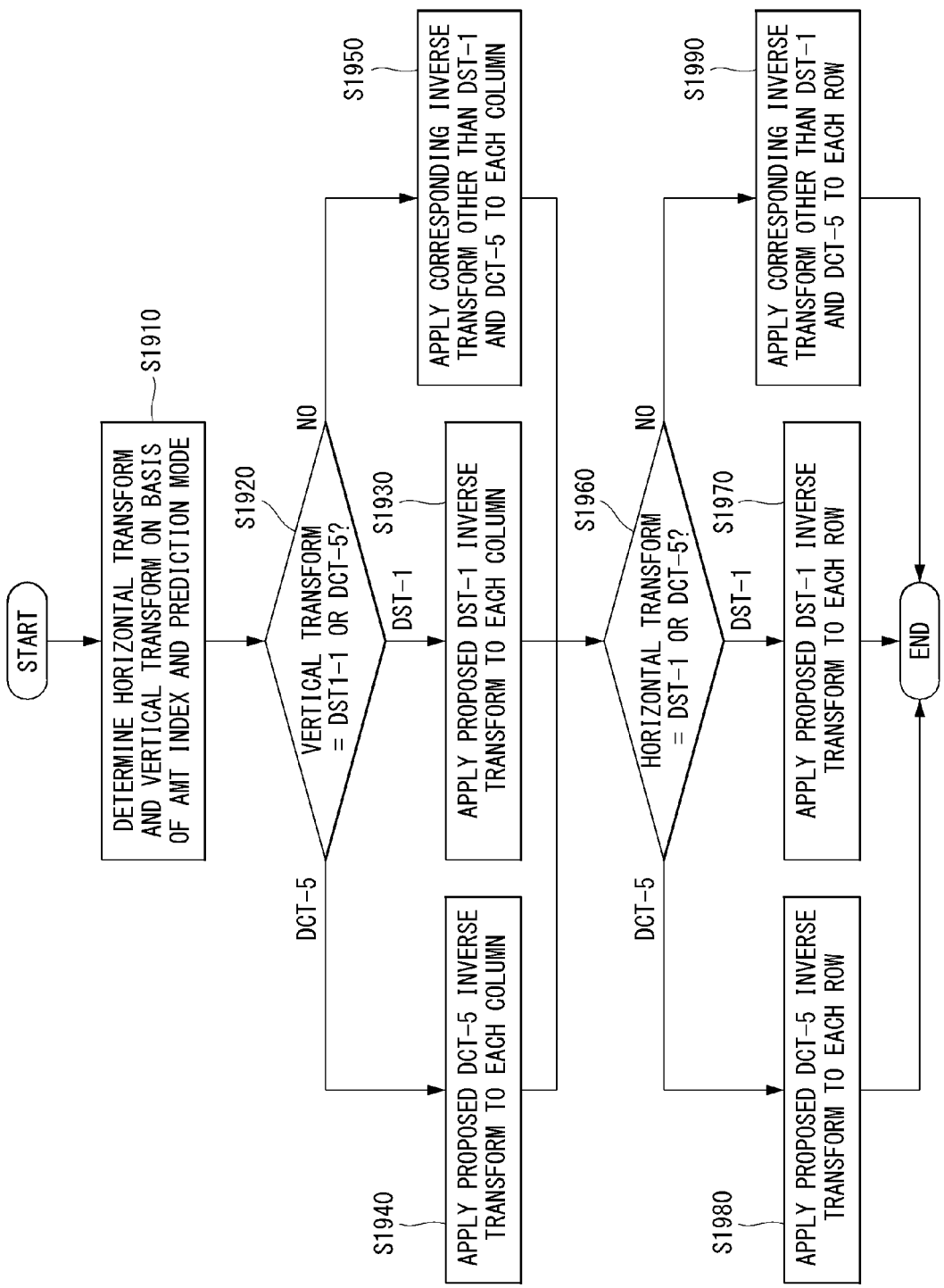

[FIG. 20]
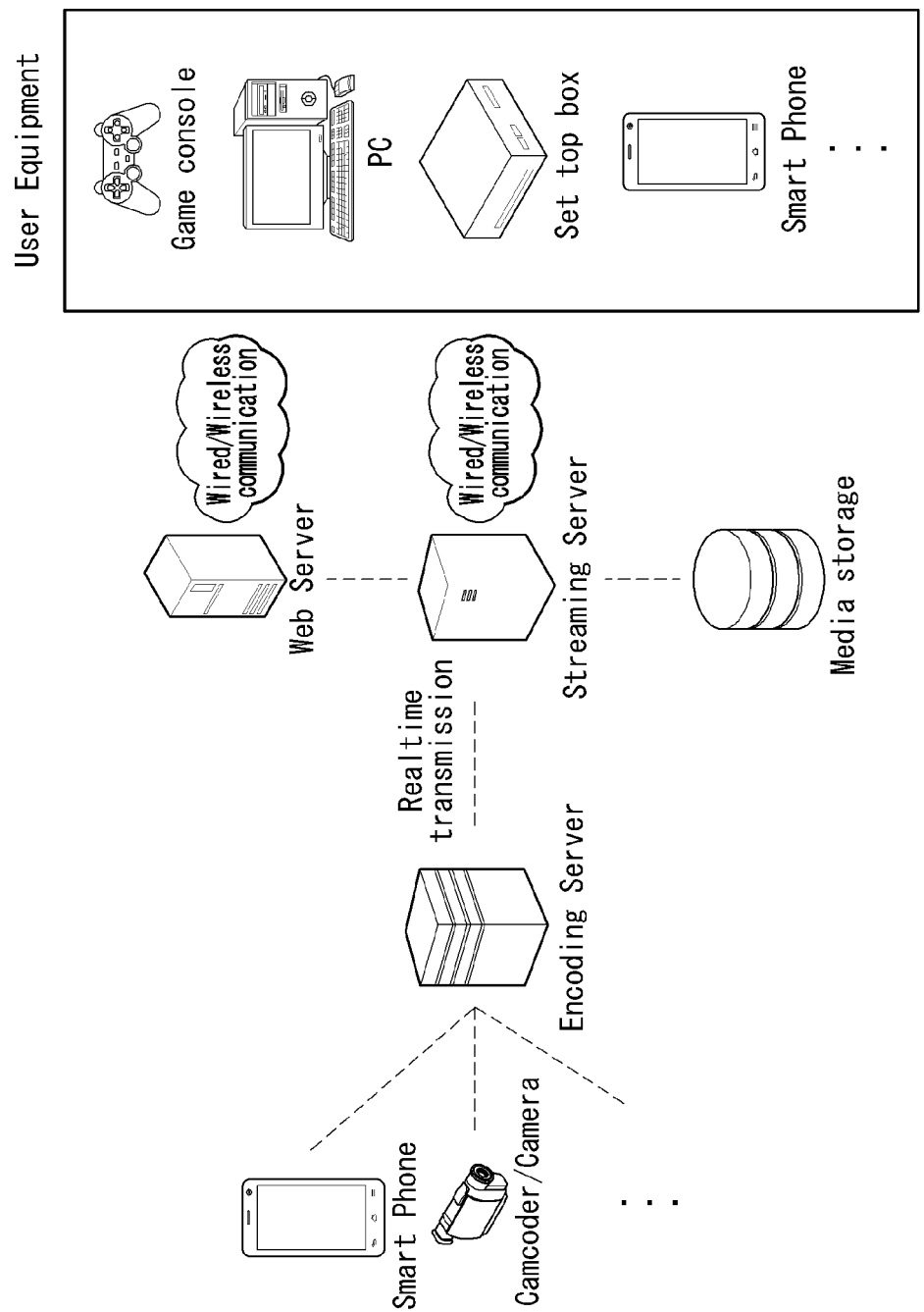

METHOD AND APPARATUS FOR PERFORMING LOW-COMPLEXITY COMPUTATION OF TRANSFORM KERNEL FOR VIDEO COMPRESSION

CROSS-REFERENCE TO RELATED APPLICATIONS

The present application is the National Stage filing under 35 U.S.C. 371 of International Application No. PCT/KR2018/006538, filed on Jun. 8, 2018, which claims the benefit of U.S. Provisional application No. 62/517,099 filed on Jun. 8, 2017, No. 62/517,098 filed on Jun. 8, 2017, No. 62/611,547 filed on Dec. 29, 2017, and No. 62/611,546 filed on Dec. 29, 2017, the contents of which are all hereby incorporated by reference herein in their entirety.

TECHNICAL FIELD

The present disclosure relates to a method and an apparatus for processing a video signal, and more particularly, to a technology for reducing computation for DST-1 (Discrete Sine Transform-1) and DST-5 (Discrete Cosine Transform-5) among transform kernels for video compression.

BACKGROUND ART

Next-generation video content will have characteristics of high spatial resolution, a high frame rate, and high dimensionality of scene representation. In order to process such content, it will lead to a tremendous increase in terms of memory storage, a memory access rate, and processing power.

Therefore, there is a need to design a new coding tool for processing the next-generation video contents more efficiently. In particular, when transform is applied, there is a need to design more efficient transform in terms of coding efficiency and complexity.

Matrix computation should be performed in order to perform transform compression of DST-1, but a multiplication operation of (N)×(N) with respect to an input signal having an N×N block size. This means that as the block size increases, a computation amount drastically increases and causes a drastic computation amount to increase in an environment such as hardware SoC.

However, there was, in the past, no case where a research of performing low-complexity computation through matrix decomposition without performing complex matrix computation even though DST-1 makes a significant contribution to next-generation coding compression performance. Since a DST-1 kernel is not directly mathematically related to DFT, there is a difficulty that Fast Fourier Transform (FFT) methods of fast performing computation of Discrete Fourier Transform (DFT) may not be applied.

In addition, even in the case of DCT-5, Fast computation algorithm does not exist and complexity of the Fast computation algorithm is very large by simple matrix computation. Accordingly, a technique for low-complexity computation is required.

DISCLOSURE

Technical Problem

The present disclosure provides a low-complexity computation algorithm, for a transform kernel for video compression.

The present disclosure provides a method for reducing computation for Discrete Sine Transform-1 (DST-1) and Discrete Cosine Transform-5 (DST-5) among transform kernels for video compression.

The present disclosure provides an encoder/decoder structure for reflecting a new transform design.

Technical Solution

The present disclosure provides a method for reducing complexity and enhancing coding efficiency through a new transform design.

The present disclosure provides a method for transforming DST-1 having a length of N into DCT-2 having a length of N+1 based on a fact that DCT-2 having a length of (N+1) is linearly mapped to DST-1 having the length of N.

The present disclosure provides a method for applying DFT for odd length FFT based on a fact that when an input of DCT-2 having an odd length is permutated, the permutated input may correspond to Discrete Fourier Transform (DFT) having the same length.

The present disclosure provides a low-complexity computation algorithm for DCT-6 utilizing Fast Fourier Transform (FFT) based on a fact that DCT-5 and DCT-6 have a linear relationship.

The present disclosure provides a method for reducing a computation amount by using a relationship of DCT-6 and FFT.

The present disclosure provides a method for maximally reducing the computation amount according to a length by using a method suitable for each length among various FFT methods.

Advantageous Effects

The present disclosure provides an algorithm in which DST-1 having a length of N is transformed into DCT-2 having a length of N+1 and an input of DCT-2 having an odd length is permutated to correspond to Discrete Fourier Transform (DFT) having the same length to reduce a multiplication operation amount, thereby reducing complexity.

Further, the present disclosure provides a low-complexity computation algorithm for DCT-6 utilizing Fast Fourier Transform (FFT) based on a fact that DCT-5 and DCT-6 have a linear relationship to significantly reduce multiplication which exerts a large influence on total computation complexity. Since the linear computation between DCT-5 and DCT-6 does not cause a significant influence on overall computation, this may be more efficient.

As described above, the total computation complexity of a new low-complexity computation algorithm can be significantly enhanced.

DESCRIPTION OF DRAWINGS

FIG. 1 is a schematic block diagram of an encoder in which encoding of a video signal is performed as an embodiment to which the present disclosure is applied.

FIG. 2 is a schematic block diagram of a decoder in which decoding of a video signal is performed as an embodiment to which the present disclosure is applied.

FIG. 3 is a table showing a transform configuration group to which Adaptive Multiple Transform (AMT) is applied as an embodiment to which the present disclosure is applied.

FIG. 4 is a flowchart showing an encoding process in which Adaptive Multiple Transform (AMT) is performed as an embodiment to which the present disclosure is applied.

FIG. 5 is a flowchart showing a decoding process in which Adaptive Multiple Transform (AMT) is performed as an embodiment to which the present disclosure is applied.

FIG. 6 is a flowchart showing a process of fast computation for DST-1 as an embodiment to which the present disclosure is applied.

FIGS. 7 to 9 are diagrams illustrating a process of performing 33-FFT as embodiments to which the present disclosure is applied.

FIG. 10 is a low-complexity computation flow graph of DCT-5 as an embodiment to which the present disclosure is applied.

FIG. 11 is a flowchart for describing a low-complexity computation process of forward and backward DCT-5 as an embodiment to which the present disclosure is applied.

FIGS. 12 to 15 are low-complexity computation flow graphs of DCT-6 for lengths of 4, 8, 16, and 32 as embodiments to which the present disclosure is applied.

FIG. 16 is a flowchart for describing a process of encoding an AMT flag and an AMT index as an embodiment to which the present disclosure is applied.

FIG. 17 is a flowchart for describing an encoding process of applying DST-1 or DCT-5 to a row or a column as an embodiment to which the present disclosure is applied.

FIG. 18 is a flowchart for describing a decoding process in which horizontal transform or vertical transform is applied to a row or a column based on an AMT flag and an AMT index as an embodiment to which the present disclosure is applied.

FIG. 19 is a flowchart for describing a decoding process of applying DST-1 or DCT-5 to a row or a column as an embodiment to which the present disclosure is applied.

FIG. 20 is a structure diagram of a content streaming system as an embodiment to which the present disclosure is applied.

BEST MODE

The present disclosure provides a method for processing a video signal by using a linear relationship between transform types, including: determining a transform group based on a prediction of a current block; parsing a transform combination index from the video signal, wherein the transform combination index indicates one of a plurality of transform combinations in the transform group; deriving a transform combination corresponding to the transform combination index, wherein the transform combination is composed of a horizontal transform and a vertical transform, and includes DST-1 or DCT-5; performing an inverse-transform on the current block based on the transform combination; and reconstructing the video signal by using the inverse-transformed current block.

In the present disclosure, the performing the inverse-transform includes, if the horizontal transform or the vertical transform is DST-1, performing a linear mapping on N length DST-1 to N+1 length DCT-2; outputting N+1 length DFT N+1 by transposing the N+1 length DCT-2; and performing N+1 length FFT on the N+1 length DFT.

In the present disclosure, the performing the inverse transform includes, if the horizontal transform or the vertical transform is DCT-5, performing one multiplication and (N−1) times of addition operations on DCT-6 transform kernel; performing (2N−1) length Winograd FFT; and outputting DCT-5 transform kernel by performing N times of multiplication operations.

In the present disclosure, the performing the inverse transform includes, if the vertical transform is DST-1 or DCT-5, applying an inverse transform of the DST-1 or an inverse transform of the DCT-5 on each row, and then identifying whether the horizontal transform is DST-1 or DCT-5.

In the present disclosure, if the horizontal transform is DST-1 or DCT-5 as a result of the identification, applying an inverse-transform of DST-1 or an inverse-transform of DST-5 to each column.

In the present disclosure, the transform combination index is transmitted in each transform unit.

The present disclosure provides an for processing a video signal using a linear relationship between transform types, including: a parsing unit for parsing a transform combination index from the video signal, wherein the transform combination index indicates one of a plurality of transform combinations in the transform group; an inverse-transform unit for determining a transform group based on a prediction of a current block, deriving a transform combination corresponding to the transform combination index, performing an inverse-transform on the current block based on the transform combination; and a reconstruction unit for reconstructing the video signal by using the inverse-transformed current block, in which the transform combination is composed of a horizontal transform and a vertical transform, and includes DST-1 or DCT-5.

In the present disclosure, if the horizontal transform or the vertical transform is DST-1, the inverse-transform performs a linear mapping on N length DST-1 to N+1 length DCT-2, outputs N+1 length DFT N+1 by transposing the N+1 length DCT-2, and performs N+1 length FFT on the N+1 length DFT.

In the present disclosure, if the horizontal transform or the vertical transform is DCT-5, the inverse-transform unit performs one multiplication and (N−1) times of addition operations on DCT-6 transform kernel, performs (2N−1) length Winograd FFT, and outputs DCT-5 transform kernel by performing N times of multiplication operations.

In the present disclosure, if the vertical transform is DST-1 or DCT-5, the inverse-transform unit applies an inverse transform of the DST-1 or an inverse transform of the DCT-5 on each column and then identifies whether the horizontal transform is DST-1 or DCT-5 and if the horizontal transform is DST-1 or DCT-5, the inverse-transform unit applies the inverse transform of DST-1 or the inverse transform of DCT-5 on each row.

MODE FOR INVENTION

Hereinafter, constructions and operations according to embodiments of the present disclosure are described with reference to the accompanying drawings. The constructions and operations of the present disclosure described with reference to the drawings are described as only embodiments, and the technical spirit and core components of the present disclosure are not restricted by the constructions and operations.

Furthermore, common terms that are now widely used are selected as terms used in the present disclosure, but terms randomly selected by the applicant are used in specific cases. In such a case, a corresponding term should not be interpreted based on only the name of a term used in the description of the present disclosure because the meaning of the corresponding term is clearly described in the detailed description of a corresponding part, but should be interpreted by checking even the meaning of the corresponding term.

Furthermore, terms used in the present disclosure are common terms selected to describe the disclosure, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting and division may be properly replaced and interpreted in each coding process.

FIG. 1 is an embodiment to which the present disclosure may be applied, and shows a schematic block diagram of an encoder in which the encoding of a video signal is performed.

Referring to FIG. 1, the encoder 100 may be configured to include an image splitting unit 110, a transform unit 120, a quantization unit 130, an inverse quantization unit 140, an inverse transform unit 150, a filtering unit 160, a decoded picture buffer (DPB) 170, an inter prediction unit 180, an intra prediction unit 185, and an entropy encoding unit 190.

The image splitting unit 110 may divide an input image (or, picture, frame), input to the encoder 100, into one or more processing units. For example, the processing unit may be a coding tree unit (CTU), a coding unit (CU), a prediction unit (PU) or a transform unit (TU).

However, the terms are merely used for convenience of description for the present disclosure, and the present disclosure is not limited to the definition of a corresponding term. Furthermore, in the present disclosure, for convenience of description, a video signal is used as a unit used in a process of encoding or decoding a video signal, but the present disclosure is not limited thereto and a video signal may be properly interpreted based on invention contents.

The encoder 100 may generate a residual signal by subtracting a prediction signal, output from the inter prediction unit 180 or the intra prediction unit 185, from the input image signal. The generated residual signal is transmitted to the transform unit 120.

The present disclosure provides a method for transforming DST-1 having a length of N into DCT-2 having a length of N+1 based on a fact that DCT-2 having a length of (N+1) is linearly mapped to DST-1 having the length of N.

The present disclosure provides a method for applying DFT for odd length FFT based on a fact that when an input of DCT-2 having an odd length is permutated, the permutated input may correspond to Discrete Fourier Transform (DFT) having the same length.

The present disclosure provides a low-complexity computation algorithm for DCT-6 utilizing Fast Fourier Transform (FFT) based on a fact that DCT-5 and DCT-6 have a linear relationship.

The present disclosure provides a method for reducing a computation amount by using a relationship of DCT-6 and FFT.

The present disclosure provides a method for maximally reducing the computation amount according to a length by using a method suitable for each length among various FFT methods.

Detailed embodiments thereof will be described in more detail in the present disclosure.

The quantization unit 130 may quantize the transform coefficient and transmit it to the entropy encoding unit 190. The entropy encoding unit 190 may entropy-code the quantized signal and output it as a bitstream.

The quantized signal output from the quantization unit 130 may be used to generate a prediction signal. For example, the quantized signal may reconstruct a residual signal by applying dequantization and inverse transform through the inverse quantization unit 140 and the inverse transform unit 150 within a loop. A reconstructed signal may be generated by adding the reconstructed residual signal to the prediction signal output from the inter prediction unit 180 or the intra prediction unit 185.

Meanwhile, artifacts in which a block boundary is viewed may occur by a quantization error occurred in the compression process. Such a phenomenon is called blocking artifacts, which are one of important factors to evaluate picture quality. In order to reduce such artifacts, a filtering process may be performed. Picture quality can be improved by removing blocking artifacts and also reducing an error of a current picture through such a filtering process.

The filtering unit 160 applies filtering to the reconstructed signal and outputs the filtered signal to a playback device or transmits the filtered signal to the decoded picture buffer 170. The filtered signal transmitted to the decoded picture buffer 170 may be used as a reference picture in the inter prediction unit 180. As described above, not only picture quality, but coding efficiency can be improved using the filtered picture as a reference picture in an interframe prediction mode.

The decoded picture buffer 170 may store the filtered picture in order to use it as a reference picture in the inter prediction unit 180.

The inter prediction unit 180 performs temporal prediction and/or spatial prediction in order to remove temporal redundancy and/or spatial redundancy with reference to a reconstructed picture. In this case, the reference picture used to perform prediction may include blocking artifacts or ringing artifacts because it is a signal transformed through quantization and dequantization in a block unit upon coding/decoding before.

Accordingly, the inter prediction unit 180 may interpolate a signal between pixels in a subpixel unit by applying a lowpass filter in order to solve performance degradation attributable to the discontinuity or quantization of a signal. In this case, the subpixel means a virtual pixel generated by applying an interpolation filter, and an integer pixel means an actual pixel present in a reconstructed picture. Linear interpolation, bi-linear interpolation or a Wiener filter may be applied as an interpolation method.

The interpolation filter may be applied to a reconstructed picture to improve the precision of prediction. For example, the inter prediction unit 180 may generate an interpolation pixel by applying the interpolation filter to an integer pixel, and may perform prediction using an interpolated block configured with interpolated pixels as a prediction block.

The intra prediction unit 185 may predict a current block with reference to surrounding samples of a block on which encoding is to be now performed. The intra prediction unit 185 may perform the following process in order to perform intra prediction. First, a reference sample necessary to generate a prediction signal may be prepared. Furthermore, a prediction signal may be generated using the prepared reference sample. Thereafter, a prediction mode is encoded. In this case, the reference sample may be prepared through reference sample padding and/or reference sample filtering. The reference sample may include a quantization error because it has experienced a prediction and reconstruction process. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

FIG. 2 is an embodiment to which the present disclosure may be applied, and shows a schematic block diagram of a decoder in which the decoding of a video signal is performed.

Referring to FIG. 2, the decoder 200 may be configured to include a parsing unit (not shown), an entropy decoding unit 210, a dequantization unit (or inverse quantization unit) 220, an inverse transform unit 230, a filtering unit 240, a decoded picture buffer (DPB) 250, an inter prediction unit 260, an intra prediction unit 265.

Further, a reconstructed video signals outputted from the decoder 200 may be played by a playback device.

The decoder 200 may receive a signal output from the encoder 100 of FIG. 1, and the received signal may be entropy-decoded through the entropy decoding unit 210.

The dequantization unit 220 obtains a transform coefficient from the entropy-decoded signal using quantization step size information.

The inverse transform unit 230 obtains a residual signal by inverse-transforming the transform coefficient. Here, the present disclosure may provide a method for applying DST-1 or DCT-5 to which a low-complexity algorithm is applied to a row or a column and the embodiments described in the present disclosure may be applied. In addition, the embodiments described in the encoder may also be applied to the decoder.

A reconstructed signal is generated by adding the obtained residual signal and a prediction signal outputted from the inter predictor 260 or the intra predictor 265.

The filtering unit 240 applies filtering to the reconstructed signal and outputs the filtered signal to a playback device or transmits the filtered signal to the decoded picture buffer 250. The filtered signal transmitted to the decoded picture buffer 250 may be used as a reference picture in the inter predictor 260.

In the present disclosure, the transformer 120 of the encoder 100 and embodiments described in each of functional units described may be applied in each of inverse transform unit 230 of the decoder and corresponding functional units.

FIG. 3 is a table showing a transform configuration group to which Adaptive Multiple Transform (AMT) is applied as an embodiment to which the present disclosure is applied.

Referring to FIG. 3, the transform configuration groups may be determined based on the prediction mode and the number of groups may be a total of six groups G0 to G5. Here, G0 to G4 correspond to a case where an intra prediction is applied and G5 represents transform combinations (or transform sets and transform combination sets) applied to the residual block generated by the inter prediction.

One transform combination may be constituted by a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and transmitted by encoding the transform combination index from the encoder to the decoder.

As an embodiment, the residual data (or residual signal) obtained through the intra prediction may have different statistical characteristics according to the intra prediction mode. Therefore, as illustrated in FIG. 3, transforms other than a general cosine transform may be applied to each intra prediction mode. In the present disclosure, the transform type may be expressed as, for example, DCT-Type 2, DCT-II, DCT2, or DCT-2.

Referring to FIG. 3, a case of using 35 intra prediction modes and a case of using 67 intra prediction modes are illustrated. A plurality of transform combinations may be applied to each transform configuration group divided in each intra prediction mode column. For example, the plurality of transform combinations may be constituted by four (row direction transforms and column direction transforms) combinations. As a specific example, DST-7 and DST-5 may be applied in a row (horizontal) direction and a column (vertical) direction in group 0, and as a result, a total of four combinations are available.

Since a total of transform kernel combinations may be applied to each intra prediction mode, a transform combination index for selecting one of the transform kernel combinations may be transmitted every transform unit. In the present disclosure, the transform combination index may be called AMT index and expressed as amt_idx.

Further, in addition to the transform kernels presented in FIG. 3 above, a case where DCT-2 is optimal for both the row direction and the column direction due to characteristics of the residual signal may occur. Accordingly, the AMT flag is defined for each coding unit to adaptively perform the transform. Here, when the AMT flag is 0, DCT-2 may be applied to both the row direction and the column direction and when the AMT flag is 1, one of four combinations may be selected or determined through the AMT index.

As an embodiment, when the AMT flag is 0, if the number of non-zero transform coefficients for one transform unit is smaller than 3, the DST-7 may be applied both the row direction and the column direction is not applied without applying the transform kernels of FIG. 3.

As an embodiment, when the AMT flag is 0, if the number of non-zero transform coefficients is smaller than 3, by first parsing the transform coefficient values, the amount of additional information transmission may be reduced by applying the DST-7 without parsing the AMT index.

As an embodiment, if a number of transform coefficients is smaller than 3 in response to parsing transform coefficient values first, we can reduce additional information transmission amount by applying DST-7 without parsing AMT index.

As an embodiment, the AMT may be applied only when both a width and a height of the transform unit is equal to or smaller than 32.

As an embodiment, FIG. 3 may be preconfigured through off-line training.

As an embodiment, the AMT index may be defined as one index which may simultaneously indicate the horizontal transform and the vertical transform. Alternatively, the AMT index may be separately defined as a horizontal transform index and a vertical transform index.

FIG. 4 is a flowchart showing an encoding process in which Adaptive Multiple Transforms (AMT) is performed as an embodiment to which the present disclosure is applied.

In the present disclosure, an embodiment in which transforms are a separately applied to the horizontal direction and the vertical direction is basically described, but the transform combination may be configured as non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 3 may be used.

Further, schemes proposed by the present disclosure may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform group corresponding to the current block (S410). Here, the transform group may mean the transform group of FIG. 3 and the present disclosure is not limited thereto and the transform configuration group may be constituted by other transform combinations.

The encoder may perform a transform for candidate transform combinations usable in the transform group (S420).

As a result of performing the transform, the encoder may determine or select a transform combination having smallest rate distortion (RD) cost (S430).

The encoder may encode the transform combination index corresponding to the selected transform combination (S440).

FIG. 5 is a flowchart showing a decoding process in which AMT (Adaptive Multiple Transform) is performed as an embodiment to which the present disclosure is applied.

First, the decoder may determine the transform group for the current block (S510).

The decoder may parse the transform combination index and here, the transform combination index may correspond to any one of the plurality of transform combinations in the transform group (S520).

The decoder may derive the transform combination corresponding to the transform combination index (S530). Here, the transform combination may mean the transform combination described in FIG. 3, but the present disclosure is not limited thereto. That is, the decoder may be configured by another transform combination.

The decoder may perform the inverse transform for the current block based on the transform combination (S540). When the transform combination is constituted by the row transform and the column transform, the column transform may be applied after applying the row transform first. However, the present disclosure is not limited thereto and the transform order may be reversed or when the transform combination is constituted by the non-separable transforms, the non-separable transform may be immediately applied.

On the other hand, as another embodiment, a process of determining the transform group and a process of parsing the transform combination index may be performed at the same time.

(Embodiment 1) Low-Complexity Computation Method of DST-1

FIG. 6 is a flowchart showing a process of fast computation for DST-1 as an embodiment to which the present disclosure is applied.

Overview of DST-1

DST-1 is defined as shown in Equation 1.

$$[S_N^I]_{n,k} = \sqrt{\frac{2}{N+1}} \sin\left(\frac{\pi(n+1)(k+1)}{N+1}\right),$$ [Equation 1]

$n, k \in [0, N-1]$

When matrix computation of N×N transform kernel DST-1 is performed, multiplication of N×N is required. It may be contrived that in order to indirectly derive decomposition computation for DST-1, the decomposition computation may be first represented through linear mapping of DST-1 and DCT-2. When a sine part is shown except for a coefficient of Equation 1 in order to conveniently express the relationship of DST-1 and DCT-2, the sine part may be expressed as shown in Equation 2.

$$DST1 = \sin\left(\frac{\pi(n+1)(k+1)}{N+1}\right), n, k \in [0, N-1]$$ [Equation 2]

DCT-2 may be defined as shown in Equation 3.

$$[C_N^{II}]_{n,k} = \sqrt{\frac{2}{N}} \varepsilon_k \cos\left(\frac{\pi(2n+1)k}{2N}\right),$$ [Equation 3]

$n, k \in [0, N-1]$ $$\varepsilon_k = \begin{cases} \frac{1}{\sqrt{2}} & k = 0 \\ 1, & \text{otherwise} \end{cases}$$

Similarly, when the matrix of N×N transform kernel DCT-2 is directly computed, multiplication of $N^2$ is required. Similarly, when the matrix is simply expressed by an equation for linear mapping, the matrix may be expressed as shown in Equation 4. In this case, N+1 is substituted for N in order to match (N+1)×(N+1) with DST-1 of N×N. As even in Equation 3, when only a cosine part is expressed except for a leading coefficient, the cosine part may be expressed as shown in Equation 4.

$$DCT_2 = \cos\left(\frac{\pi(2l+1)k}{2(N+1)}\right)$$ [Equation 4]

Linear Mapping Relationship Between DST-1 and DCT-2

The N×N DST-1 kernel may be matched with an (N+1)×(N+1) DCT-2 kernel. The relationship between DST-1 and DCT-2 is shown in Equation 5.

$$\begin{bmatrix} 1 & \\ & DST_1 \end{bmatrix} = D_{DCT2}^{-1} \cdot D_{DST1} \cdot DCT_2 \cdot B^{-1}$$ [Equation 5]

Here, each of elements may be defined as Equations 6 to 8 below.

$$D_{DST1} = \text{diag}\left\{\sin\left((k+1)\frac{\pi}{N+1}\right), 1\right\}$$ [Equation 6]

$$D_{DCT2} = \text{diag}\left\{\cos\left(k\frac{\pi}{2(N+1)}\right)\right\}$$ [Equation 7]

-continued $$B = \begin{bmatrix} 1 & 1 & 1 & 1 & 1 & 1 \\ 1 & -1 & & & & \\ & 1 & -1 & & & \\ & & 1 & \ddots & & \\ & & & \ddots & -1 & \\ & & & & 1 & -1 \end{bmatrix} \quad \text{[Equation 8]}$$

Equation 5 above means that the kernel of DST-1 having the length of N may be matched with an N+1 length DCT-2 kernel by the linear mapping. N as the size of the block generally used during video compression becomes 4, 8, 16, 32, and 64 and the size of the kernel of DCT-2 matched therewith becomes 5, 9, 17, 33, and 65.

It may be verified that DST-1 in which N=4, 8, 16, 32, and 64 is linearly mapped to DCT-2 in which N+1=5, 9, 17, 33, and 65. Since all numbers of N+1 are odd numbers, N+1-length DCT-2 may be matched with N+1-length DFT having the same length.

First, when the input signal for DCT-2 is x(n) and a matched DFT output value is X(k), if input permutation is performed for x(n), the input permutation may be expressed as shown in Equation 9 below. In this case, for convenience, N (here, N is the odd number) is described again instead of N+1.

$$\hat{x}(n) = \begin{cases} x\left((-1)^{n+(N+1)/2+1}n + \frac{N-1}{2}\right), & \left(n = 0, 1 \ldots, \frac{N-1}{2}\right) \\ x\left((-1)^{n+(N+1)/2}(N-n) + \frac{N-1}{2}\right), & \left(n = \frac{N+1}{2}, \frac{N+3}{2}, \ldots, N-1\right) \end{cases} \quad \text{[Equation 9]}$$

The output value of DCT-2 is shown in Equation 10.

$$C(k) = \sqrt{\frac{2}{N}} \varepsilon_k \sum_{n=0}^{N-1} \cos\left(\frac{\pi(2n+1)k}{2N}\right) \quad \text{[Equation 10]}$$

Then, matching results shown in Equations 11 and 12 below may be obtained. Here, N is the odd number.

$$C(2k) = (-1)^k \text{Re}(\hat{X}(k)), \left(k = 0, 1 \ldots, \frac{N-1}{2}\right) \quad \text{[Equation 11]}$$

$$C(N-2k) = (-1)^k \text{Im}(\hat{X}(k)), \left(k = 1, 2, \ldots, \frac{N-1}{2}\right) \quad \text{[Equation 12]}$$

Such a process may mean that after which length N input signal x(n) is substituted by a rule of Equation 9 above, a real-number component of a DFT result value corresponds to a value acquired by multiplying the output value of an even-number index of DCT-2 by −1 or 1 according to the index and an imaginary-number component of the DFT result value accurately corresponds to a value acquired by multiplying the output value of the odd-number index of DCT-2 by −1 or 1 according to the index. Accordingly, it may be verified that the odd-length DCT-2 corresponds to the DFT having the same length.

As described above, a process of performing the fast computation with respect to DST-1 is described based on the linear mapping relationship between DST-1 and DCT-2.

First, the N-length DST-1 may be linearly mapped to the N+1-length DCT-2. The linear mapping relationship of DCT-2 may be used for low-complexity computation of DST-1. That is, since the input of the N-length DST-1 is mapped to the N−1-length DCT-2, the input may be expressed as shown in Equation 5.

In addition, the N+1-length DCT-2 is substituted to be output as the N+1-length DFT. Here, when the input signal for DCT-2 is x(n) and the output value of DFT is X(k), the input value of x(n) may be substituted by using Equation 6 above. Further, the N+1-length DCT-2 is matched with the N+1-length DFT having the same length. Here, the even-number index of DCT-2 is matched with the real-number component of the DFT result and the odd-number index is matched with the imaginary-number component of the DFT result, and this may be verified in Equations 8 and 9 above.

In addition, N+1-length FFT may be performed with respect to the N+1-length DFT (S630). When the block size N is 4, 8, 16, 32, and 64, N+1 becomes 5, 9, 17, 33, and 65 and in this case, since 5 and 17 are prime numbers, Winograd FFT may be used. 9, 33, and 65 may be factorized into the prime numbers by 3×3, 3×11, and 5×13, respectively. Accordingly, this may be computed by using a Prime Factor FFT algorithm.

FIGS. 7 to 9 are diagrams illustrating a process of performing 33-FFT as embodiments to which the present disclosure is applied.

Referring to FIG. 7, the length N=33 FFT used for performing DST-1 of the block size N=32 is illustrated.

Since 33 is decomposed into the prime number by 3×11, Winograd FFT having an input length of 3 may be performed eleven times and then Winograd FFT having an input length of 11 may be performed three times. Similarly, even when the block size N=8 and N=64, the computation may be performed by using Prime Factor FFT and Winograd FFT.

A low-complexity computation technique for DST-1 to which the present disclosure is applied may significantly reduce numbers of addition and multiplication with respect to most lengths. However, when the present disclosure is implemented, the following points may be considered.

First, since an exponential function may not directly be used during FFT computation, an imaginary part should be considered. Accordingly, a storage space including a real part is increased to two times and the imaginary part increases compared with a theoretical calculation amount of the multiplication operation.

Second, an exponential part of twiddle factor is different by 1 like $\omega = \exp(-2\pi i/N[0:N-1])$, the twiddle factor may be indicated by a symmetric value. Accordingly, when the twiddle factor is used, the twiddle factor may reduce both of the storage space and the computation amount of the multiplication.

Due to two points to be considered, the multiplication computation amount may be calculated which increases slightly differently from a theoretical result.

According to the present disclosure, when DST-1 is matched with DCT-2 and then FFT is applied, the input signal may be stored by each of two array methods. In addition, after applying FFT to each of two arrays, in an FFT result of one array, only the real part is brought and in the FFT result of the other array, only the imaginary part is brought and then the real part and the imaginary part are integrated to be rearranged again. Since this is substitution and replacement issues, this does not influence the computation amount.

As another embodiment, a Cooley-Tukey algorithm and a Rader algorithm may be used for low-complexity computation for odd-length DFT. Here, the Rader algorithm may represent DFT having a prime number length n by cyclic convolution having a length of (n−1) to multiply the kernel of DCT-2 increased to the N+1 length like computation having the length of N. For example, since 5 and 17 among increased lengths 5, 9, 17, 33, and 65 are the prime numbers, the Rader algorithm may be immediately applied.

Further, when the Cooley-Tukey algorithm is used, since lengths 9, 33, and 65 are factorized into the prime numbers by (3×3), (3×11), and (5×13), respectively, the Rader algorithm may be applied to each of the factorized prime numbers again. That is, two algorithms described above are used for FFT-5, FFT-9, FFT-17, FFT-33, and FFT-65 computation. Specifically, when the Cooley-Tukey algorithm is used, FFT-9 may be calculated by FFT-3 of 6 times and FFT-33 may be separately calculated into FFT-11 of 3 times and FFT-3 of 11 times. This may be verified in FIG. 7.

In addition, FFT-65 may be calculated by FFT-5 of 13 times and FFT-13 of 5 times. Thereafter, 3, 5, 11, 13, and 17-FFT for the prime number length may be changed to 2, 4, 10, 12, and 16-point circular convolution and twiddle factor, respectively through the Rader algorithm. Thereafter, since factorization into the prime numbers may be performed again, the Cooley-Tukey algorithm may also be applied. Such a process is repeated to reduce the multiplication operation amount. FIGS. 7 to 9 above illustrate an example of a process of performing 33-FFT in sequence.

Referring to FIG. 7, 11-FFT of three times, 3-FFT of 11 times, and the intermediate twiddle factor may be multiplied.

Referring to FIG. 8, 33-FFT stage1 may be illustrated and in this case, the Cooley-Tukey algorithm may be used. In FIG. 8, 3-FFT may be decomposed into 2-circular convolution and represented by the multiplication of the twiddle factor (S810).

Referring to FIG. 9, 33-FFT stage2 may be illustrated and in this case, the Rader algorithm may be used. In FIG. 9, 11-FFT may be decomposed into 10-circular convolution and here, the 10-circular convolution may also be decomposed into the multiplication of 5-FFT of 2 times, 2-FFT of 5 times, and the twiddle factor afterwards (S910).

As an embodiment, the low-complexity computation technique for the transform kernel DST-1 may be applicable to all block sizes. For example, when the Rader algorithm is used, the FFT computation of a signal in which N+1=17 may be represented by the circular convolution of 16. This adopts the Cooley-Tukey algorithm to be separately represented by 4×4 FFT. In this case, since FFT of 4 times is performed a total of two times, 4FFT of a total of 8 times is performed. Due to the Cooley-Tukey algorithm, the twiddle factor causes multiplication of (4−1)×(4−1)=9 times. 4FFT may be similarly divided into two 2FFT due to the Cooley-Tukey algorithm and since four multiplications exist in the twiddle factor, 4FFT causes four multiplications. Accordingly, in overall, the number of multiplications of 8×4+9=41 may be acquired. Reduction of the computation of the multiplication which exerts a large influence on the computation complexity through the algorithm may be may verified through Table 1 below.

TABLE 1

| N | 4 | 8 | 16 | 32 | 64 |
|---|---|---|---|---|---|
| N − DST1 | 16 | 64 | 256 | 1024 | 4096 |
| (N + 1) − DCT2 Linear mapping 2 X (N + 1) ① | 10 | 18 | 34 | 66 | 130 |
| (N + 1) odd-length FFT ② | 4 | 16 | 41 | 70 | 230 |
| Total (① + ②) | 14 | 34 | 75 | 136 | 360 |

As shown in Table 1 above, it may be verified that the multiplication operation of DST-1 is reduced as compared with the multiplication operation of the matrix computation. In particular, it may be verified that in the case of a transform kernel having a large length, an effect gradually increases. The number of additions increases, but the number of additions is slight in effect with respect to the transform kernel having the large length, and as a result, the number of additions may be disregarded.

When the present disclosure of computing DST-1 by detouring DCT-2 is used, the operation amount of the multiplication decreases to approximately 0.875, 0.531, 0.293, 0.133, and 0.088 times with respect to N=4, 8, 16, 32, and 64, respectively.

When DST-1 applied to the present disclosure is used in particular for intra prediction coding, DST-1 may contribute to a lot of compression gains. DST-1 requires a multiplication operation of (N)×(N) with respect to the input signal having the N×N block size and the multiplication operation suddenly increases as the block size increases. In this case, there are a lot of practical difficulties in performing high-complexity computation.

In the present disclosure, DST-1 is first indirectly linearly mapped to DCT-1 which may be computed by DFT and then enabled to be fast computed by using FFT. Specifically, DST-1 having the length of N (even-length, power of 2) is linearly mapped to DCT-2 having the length of (N+1) and then an input sequence is substituted so that DCT-2 is matched with DFT having the same length, i.e., (N+1). In this case, as fast computation methods for Discrete Fourier Transform (DFT), the Cooley-Tukey algorithm and the Rader algorithm may be used. Since linear computation between DST-1 and DCT-2 does not cause a significant impact on overall computation, it may be known that a proposed method is more efficient through the result of Table 1 above. That is, the present disclosure may greatly reduce the number of multiplication operations which causes the significant impact on overall computation complexity.

As another embodiment, the present disclosure provides an integer computation method through integer approximation.

Since transform encoding should be calculated with all integers in order to avoid a mismatch between the encoder and the decoder, computation techniques proposed by the present disclosure should be transformed into an integer computation and performed. Among the proposed computation techniques, there is multiplication in which a part to be changed to an integer becomes a real number. For example, multiplication for real numbers a and b may be expressed by an approximate expression for an integer value as shown in Equation 13 below.

$$a \times b \cong \frac{c}{2^p} \qquad \text{[Equation 13]}$$

Here, c and p are integers and p as a factor for determining how accurate to perform approximation may be selected by considering trade-off of between accuracy and complexity. Closest c satisfying Equation 13 above may be found and used for an actual computation. Further, in Equation 13 above, since division includes a lot of computation amounts, the division may be replaced with integer and shift computation and expressed as shown in Equation 14 below.

$$(c+2^{p-1}) \gg p \qquad \text{[Equation 14]}$$

In this case, since a computation divided by a power of 2 is easily possible by the shift computation, the computation may be expressed as above and becomes a suitable computation even in hardware. Real-number computation may be approximated by such a method and c and p may be selected by considering an approximation error and complexity.

(Embodiment 2) Low-Complexity Computation Method of DCT-5

FIG. 10 is a low-complexity computation flow graph of DCT-5 as an embodiment to which the present disclosure is applied.

Overview of DCT-5

A DST-5 transform kernel is defined as shown in Equation 15.

$$[C_N^V]_{n,k} = \frac{2}{\sqrt{2(N-1)+1}} \varepsilon_n \varepsilon_k \left( \frac{2\pi nk}{2N-1} \right), \qquad \text{[Equation 15]}$$

$$\varepsilon_n, \varepsilon_k = \begin{cases} 1/\sqrt{2} & n, k = 0 \\ 1 & \text{otherwise} \end{cases}$$

When the transform kernel for DCT-5 is also directly calculated by matrix computation, since multiplication of $N^2$ and addition of $N(N-1)$ are required with respect to the N×N transform kernel, complexity is large only by the matrix computation, and as a result, a low-complexity computation method through matrix decomposition is required.

Low-Complexity Computation Technique for DCT-5

DCT-5 has the linear relationship with DCT-6 and transform kernel relationship equations of DCT-5 and DCT-6 is shown in Equations 16 to 18 below.

$$C_N^V = D_{DCT-VI}^{-1} \cdot C_N^{VI} \cdot B \qquad \text{[Equation 16]}$$

$$D_{DCT-VI} = \text{diag}\left[ \cos\left( k \cdot \frac{\pi}{2\left(N-\frac{1}{2}\right)} \right) \right] \qquad \text{[Equation 17]}$$

$$B = \frac{1}{2} \begin{bmatrix} 2 & 1 & 0 & 0 & 0 & 0 & 0 & 0 \\ 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \\ 0 & 0 & 0 & 0 & 0 & 0 & 1 & 1 \\ 0 & 0 & 0 & 0 & 0 & 0 & 0 & 1 \end{bmatrix} \qquad \text{[Equation 18]}$$

As shown in Equations 16 to 18 above, the transform kernel of DCT-5 may be obtained only by additional addition and multiplication for the transform kernel of DST-6. For example, additional multiplication of N and addition of (N−1) are required with respect to the N×N transform kernel.

First, DCT-6 may be computed by using Winograd FFT. This may be performed by using Equation 19 below.

$$C_N^{VI} = \tfrac{1}{2} R \, \mathfrak{R}[F_{2N-1}] Q P \qquad \text{[Equation 19]}$$

Here, $C_N^{VI}$ represents a DCT-6 transform kernel having the length of N and $\mathfrak{R}[F_{2N-1}]$ represents a real part for FFT having the length of 2N−1. In addition, R may represent a matrix having a size of N×(2N−1) and may be calculated as shown in Equation 20 below.

$$[R]_{n,k} = \begin{cases} 1, & \text{if } k = n \quad n, k = 1, 3, \ldots, N-1 \\ -1, & \text{if } k = n \quad n, k = 0, 2, \ldots, N-2 \\ 0, & \text{otherwise} \end{cases}$$

In DCT-6 computation, Q may be defined as shown in Equation 21 below unlike other kernels.

$$Q = \begin{pmatrix} -2 & 0^T \\ 0 & -I_{N-1} \\ 0 & -J_{N-1} \end{pmatrix} \qquad \text{[Equation 21]}$$

Here, I represents a unit matrix, J represents a reversal matrix, and P as a permutation matrix may be defined as shown in Equation 22 below.

$$[P]_{n,k} = \begin{cases} 1, & \text{if } k = 2(N-n) \\ 0, & \text{otherwise} \end{cases} \text{ for } n = 0, 1, \ldots, N-1 \qquad \text{[Equation 22]}$$

Backward transform and forward transform of DCT-5 having an orthogonal property are performed through the same process. Accordingly, the computation processes of the forward transform and the backward transform of proposed DCT-5 are the same as each other and a flowchart of the computation is shown in FIG. 10 above.

First, in Equations 16 and 18 above, the multiplication operation for matrix B may be performed. Since matrix B is constituted by 1 and 0.5, the multiplication of matrix B may be performed only by N−1 additions and N−1 shift operations (S1010). In FIG. 10, this is expressed as pre-processing.

Next, computation for DCT-6 may be performed by using Equation 19. In this case, the computation may be performed by using Winograd FFT having the length of 2N−1 (S1020). Unlike the case of the length of 2N+1, 2N−1 may become the prime number according to the block size or otherwise.

In addition, since N multiplication as a process corresponding to multiplication of $D_{DCT-VI}^{-1}$ is a matrix constituted only by diagonal elements as shown in Equation 17 above, N multiplication operations are performed (S1030).

In the present disclosure, low-complexity computation of DCT-6 is required for low-complexity computation of DCT-5. Proposed is a method for reducing the computation amount by applying FFT by using the relationship with DFT in the case of DCT-6. The embodiment may be expressed as a flow graph with respect to the lengths 4, 8, 16, and 32. The Winograd FFT may be immediately applied like DCT-6

(FFT-7) having a length of 4 according to whether the length is the prime number and the Prime Factor FFT algorithm of dividing into two DFTs like DCT-6 (FFT-15) having a length of 8 may be used.

Hereinafter, in FIG. 11, low-complexity computation processes of forward and backward DCT-5 will be described and in FIGS. 12 to 16, low-complexity computation flow graphs of DCT-6 for lengths 4, 8, 16, and 32 will be described, respectively.

FIG. 11 is a flowchart for describing a low-complexity computation process of forward and backward DCT-5 as an embodiment to which the present disclosure is applied.

First, in the present disclosure, multiplication of one time and addition of (N−1) times may be performed for the DCT-6 transform kernel (S1110).

In addition, Winograd FFT having the length of (2N−1) may be performed (S1120).

Thereafter, N multiplication operations may be performed (S1130) and the DCT-5 transform kernel may be output (S1140).

FIGS. 12 to 15 are low-complexity computation flow graphs of DCT-6 for lengths of 4, 8, 16, and 32 as embodiments to which the present disclosure is applied.

Referring to FIG. 12, since 2N−1=7 is also the prime number at N=4, the result may be obtained by immediately applying Winograd FFT without applying the Prime Factor FFT algorithm.

However, referring to FIG. 13, since 2N−1=15 at N=8, 15 may be decomposed into the prime number 3×5. Accordingly, by using the Prime Factor FFT algorithm, the result may be obtained by sequentially performing 5 FFTs having a length of 3 as an input and 3 FFTs having a length of 5 as the input.

Referring to FIG. 14, since 2N−1=31 is the prime number at N=16, the result of DCT-6 may be obtained by immediately using Winograd FFT without a need of using the Prime Factor FFT algorithm.

However, referring to FIG. 15, since 2N−1=63 at N=32, 63 may be expressed by the multiplication of the prime numbers 7 and 9. Accordingly, the result of DCT-6 may be obtained by sequentially performing 7 FFTs having a length of 9 as the input and 9 FFTs having a length of 7 as the input.

As another embodiment, the present disclosure provides an integer computation method through integer approximation. The embodiment described in FIG. 9 above and Equations 13 and 14 may be applied and the duplicated description will be omitted.

In the present disclosure, approximate values for coefficients used for the Winograd FFT or coefficients computed in the linear relationship may be expressed as shown in Table 2 below. The coefficients presented in Table 2 above may be numbers selected by considering the approximation error, the complexity depending on the multiplication, the block size, and quantization and may be changed according to a condition.

TABLE 2

| Kernels | Lengths | Processing | Integer values | Norms |
|---|---|---|---|---|
| DCT-VI (for DCT-V) | 4 | FFT7 | −1195, −809, 57, 752 | 512 |
| | 8 | FFT3 | −887, −1536 | 724 |
| | | FFT5 | 974, −1576, −372, 572, −1280 | |
| | 16 | FFT31 | 724, −1948, −1204, −2290, 1774, 5203, −2331, 4779, 3110, −1681, −5448, 4878, 2952, −697, −5659, −3175, −4736, | 1024 |

TABLE 2-continued

| Kernels | Lengths | Processing | Integer values | Norms |
|---|---|---|---|---|
| | 32 | FFT7 | 3812, −4240, 34 −1195, −809, 57, 752, 452, −349, 547, 896 | 1448 |
| | | FFT9 | −887, −512, 962, −178, 784, −350, −1008, −658 | |
| DCT-V | 4 | Post-processing | 274, 430, 621, 1739 | 512 |
| | 8 | Post-processing | 264, 382, 409, 462, 559, 748, 1210, 3577 | 724 |
| | 16 | Post-processing | 130, 185, 188, 193, 200, 210, 224, 242, 267, 300, 348, 418, 530, 734, 1215, 3631 | 1024 |
| | 32 | Post-processing | 129, 183, 183, 185, 186, 188, 191, 194, 198, 203, 208, 214, 221, 229, 238, 249, 261, 276, 293, 313, 313, 365, 400, 444, 499, 573, 674, 820, 1051, 1467, 2441, 7318 | 1448 |

Meanwhile, the low-complexity computation algorithm for the transform kernel DCT-5 shows a result of reducing a lot of computations in the multiplication with respect to various block lengths. However, there is a trend in which the addition increases, but as the block size increases, an effect thereof relative decreases and a result in which both the addition and the multiplication are reduced as compared with the matrix computation may be verified. Through the present disclosure, it may be verified that the operation of the multiplication which exerts a large influence on computation complexity is reduced through Table 3 below.

TABLE 3

| | 4 | 8 | 16 | 32 | 64 |
|---|---|---|---|---|---|
| Matrix computation | 16 | 64 | 256 | 1024 | 4096 |
| DCT-6 | 9 | 31 | 85 | 401 | 701 |
| DCT-5 | 13 | 39 | 101 | 433 | 765 |

Finally, a result is shown in which the multiplication operation of DCT-5 is reduced as compared with the multiplication operation of direct matrix computation. In particular, it may be verified that in the case of a transform kernel having a large length, the effect is significantly large. Instead, the number of additions increases, but the effect is slight with respect to the transform kernel having the large length, and as a result, overall computation complexity is also lowered.

The present disclosure provides a low-complexity computation technique for DCT-6 utilizing Fast Fourier Transform (FFT) by using a fact that DCT-5 and DCT-6 have a linear relationship. Since the linear computation between DCT-5 and DCT-6 does not exerts a large influence on overall computation, the linear computation is more efficient, thereby showing a result of reducing a significant part of the multiplication which exerts the large influence on the overall computation complexity.

In the present disclosure, among many DST/DCT types associated with DCT-5, the relationship with DCT-6 is used and the computation amount is reduced by using the relationship between DCT-6 and FFT. Further, the computation amount may be maximally reduced according to a length by using a method suitable for each length among various FFT methods.

FIG. 16 is a flowchart for describing a process of encoding an AMT flag and an AMT index as an embodiment to which the present disclosure is applied.

The encoder may determine whether the Adaptive Multiple Transforms (AMT) is applied to the current block (S1610).

When the Adaptive Multiple Transforms (AMT) is applied, the encoder may encode AMT flag=1 (S1620).

In addition, the encoder may determine the AMT index based on at least one of the prediction mode, the horizontal transform, and the vertical transform of the current block (S1630). Here, the AMT index may mean an index indicating any one of the plurality of transform combinations for each intra prediction mode and the AMT index may be transmitted for each transform unit.

When the AMT index is determined, the encoder may encode the AMT index (S1640).

On the other hand, when the Adaptive Multiple Transforms (AMT) is not applied, the encoder may encode AMT flag=0 (S1650).

FIG. 17 is a flowchart for describing an encoding process of applying DST-1 or DCT-5 to a row or a column as an embodiment to which the present disclosure is applied.

The present disclosure provides a method for reducing computation for Discrete Sine Transform-1 (DST-1) or Discrete Cosine Transform-5 (DCT-5) among transform kernels for video compression.

First, an encoder may determine whether AMT is applied (S1710) and when the AMT is applied, the encoder may verify whether horizontal transform is DST-1 or DCT-5 (S1720).

When the horizontal transform is DST-1 or DCT-5, the encoder may apply DST-1 or DCT-5 every row so as to perform the low-complexity computation according to the embodiments of the present disclosure (S1730).

For example, when the horizontal transform is DST-1, the fast computation may be performed with respect to DST-1 based on the linear mapping relationship between DST-1 and DCT-2. First, the N-length DST-1 may be linearly mapped to the N+1-length DCT-2. In addition, the N+1-length DCT-2 is substituted to be output as the N+1-length DFT. Here, when the input signal for DCT-2 is x(n) and the output value of DFT is X(k), the input value of x(n) may be substituted by using Equation 6 above. Further, the N+1-length DCT-2 is matched with the N+1-length DFT having the same length. Here, the even-number index of DCT-2 is matched with the real-number component of the DFT result and the odd-number index is matched with the imaginary-number component of the DFT result, and this may be verified in Equations 8 and 9 above. In addition, N+1-length FFT may be performed with respect to the N+1-length DFT. For example, when the block size N is 4, 8, 16, 32, and 64, N+1 becomes 5, 9, 17, 33, and 65 and in this case, since 5 and 17 are prime numbers, Winograd FFT may be used. 9, 33, and 65 may be factorized into the prime numbers by 3×3, 3×11, and 5×13, respectively. Accordingly, this may be computed by using the Prime Factor FFT algorithm.

As another example, when the horizontal transform is DST-5, the fast computation may be performed with respect to DST-6 based on the linear mapping relationship between DCT-5 and DCT-6. First, multiplication of one time and addition of (N−1) times may be performed for the DCT-6 transform kernel. In addition, Winograd FFT having the length of (2N−1) may be performed and then N multiplication operations may be performed and the DCT-5 transform kernel may be output.

Meanwhile, when the horizontal transform is not DST-1 and DCT-5, the encoder may apply transform other than DST-1 and DCT-5 every row (S1740).

Thereafter, the encoder may check whether the vertical transform is DST-1 or DCT-5 (S1750).

When the vertical transform is DST-1 or DCT-5, the encoder may apply DST-1 or DCT-5 every row so as to perform the low-complexity computation according to the embodiments of the present disclosure (S1760). Even in this case, the aforementioned low-complexity algorithm may be applied.

When the vertical transform is not DST-1 and DCT-5, the encoder may apply transform other than DST-1 and DCT-5 every column (S1770).

FIG. 18 is a flowchart for describing a decoding process in which horizontal transform or vertical transform is applied to a row or a column based on an AMT flag and an AMT index as an embodiment to which the present disclosure is applied.

The decoder may parse the AMT flag from the bitstream (S1810). Here, the AMT flag may indicate whether the Adaptive Multiple Transforms (AMT) is applied to the current block.

The decoder may determine whether the Adaptive Multiple Transforms (AMT) is applied to the current block based on the AMT flag (S1820). For example, it may be checked whether the AMT flag is 1.

When the AMT flag is 1, the decoder may parse the AMT index (S1830). Here, the AMT index may mean an index indicating any one of the plurality of transform combinations for each intra prediction mode and the AMT index may be transmitted for each transform unit. Alternatively, the AMT index may mean an index indicating any one transform combination defined in a preconfigured transform combination table and here, the preconfigured transform combination table may mean FIG. 3, but the present disclosure is limited thereto.

The decoder may derive or determine the horizontal transform and the vertical transform based on at least one of the AMT index and the prediction mode (S1840).

Alternatively, the decoder may derive the transform combination corresponding to the AMT index. For example, the decoder may derive or determine the horizontal transform and the vertical transform corresponding to the AMT index.

Meanwhile, when the AMT flag is 0, the decoder may apply the preconfigured vertical inverse transform for each column. For example, the vertical inverse transform may be inverse transform of DCT-2.

In addition, the decoder may apply preconfigured horizontal inverse transform for each row. For example, the horizontal inverse transform may be inverse transform of DCT-2. That is, when the AMT flag is 0, the transform kernel preconfigured by the encoder or decoder may be used. For example, the transform kernel that is not defined in the transform combination table illustrated in FIG. 3, but is widely used may be used.

FIG. 19 is a flowchart for describing a decoding process of applying DST-1 or DCT-5 to a row or a column as an embodiment to which the present disclosure is applied.

The present disclosure provides a method for reducing computation for Discrete Sine Transform-1 (DST-1) or Discrete Cosine Transform-5 (DCT-5) among transform kernels for video compression.

The decoder may derive or determine the horizontal transform and the vertical transform based on at least one of the AMT index and the prediction mode (S1910).

In this case, the decoder may check whether the vertical transform is DST-1 or DCT-5 (S1920).

When the vertical transform is DST-1 or DCT-5, the decoder may apply DST-1 or DCT-5 inverse transform every column so as to perform the low-complexity computation according to the embodiments of the present disclosure (S1930 and S1940).

Meanwhile, when the vertical transform is not DST-1 and DCT-5, the decoder may apply inverse transform other than DST-1 and DCT-5 every column (S1950).

Thereafter, the decoder may check whether the horizontal transform is DST-1 or DCT-5 (S1960).

When the horizontal transform is DST-1 or DCT-5, the decoder may apply DST-1 or DCT-5 inverse transform every row so as to perform the low-complexity computation according to the embodiments of the present disclosure (S1970 and S1980). Even in this case, the aforementioned low-complexity algorithm may be applied.

When the horizontal transform is not DST-1 and DCT-5, the decoder may apply inverse transform other than DST-1 and DCT-5 every row (S1990).

FIG. 20 is a structure diagram of a content streaming system as an embodiment to which the present disclosure is applied.

Referring to FIG. 20, the content streaming system to which the present disclosure is applied may largely include an encoding server, a streaming server, a web server, a media storage, a user device, and a multimedia input device.

The encoding server compresses contents input from multimedia input devices including a smartphone, a camera, a camcorder, etc., into digital data to serve to generate the bitstream and transmit the bitstream to the streaming server. As another example, when the multimedia input devices including the smartphone, the camera, the camcorder, etc., directly generate the bitstream, the encoding server may be omitted.

The bitstream may be generated by the encoding method or the bitstream generating method to which the present disclosure is applied and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD), etc., and the like.

Each server in the content streaming system may be operated as a distributed server and in this case, data received by each server may be distributed and processed.

As described above, the embodiments described in the present disclosure may be implemented and performed on a processor, a micro processor, a controller or a chip. For example, the function units shown in each of drawings may be implemented and performed on a computer, a processor, a micro processor, a controller, or a chip.

Furthermore, the decoder and the encoder to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, over the top (OTT) video device, an Internet streaming service provision device, a three-dimensional (3D) video device, a video telephony device, and a medical video device, and may be used to process a video signal or a data signal. For example, over the top (OTT) video device may comprise a game console, a blu-ray player, Internet access TV, home theater system, smartphone, tablet PC, digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices and distribution storage devices in which computer-readable data is stored. The computer-readable recording medium may include Blueray disk (BD), a universal serial bus (USB), ROM, PROM, EPROM, EEPROM, RAM, CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

In addition, the embodiment of the present disclosure may be implemented as a computer program product by a program code, which may be performed on the computer by the embodiment of the present disclosure. The program code may be stored on a computer-readable carrier.

INDUSTRIAL APPLICABILITY

The above-described preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:

1. A method for processing a video signal using a linear relationship between transform types, comprising:
   determining, by a processor, a transform group based on a prediction of a current block;
   parsing, by the processor, a transform combination index from the video signal, wherein the transform combination index indicates one of a plurality of transform combinations in the transform group;
   deriving, by the processor, a transform combination corresponding to the transform combination index, wherein the transform combination is composed of a horizontal transform and a vertical transform, and includes DST-1 or DCT-5;

performing, by the processor, an inverse-transform on the current block based on the transform combination; and reconstructing, by the processor, the video signal by using the inverse-transformed current block, wherein the performing the inverse-transform comprises:

applying an inverse transform of the DST-1 or an inverse transform of the DCT-5 on each row when the vertical transform is DST-1 or DCT-5, and applying an inverse-transform of DST-1 or an inverse-transform of DST-5 to each column when the horizontal transform is DST-1 or DCT-5.

2. The method of claim 1, wherein the applying the inverse-transform of the DST-1 comprises:

performing a linear mapping on N length DST-1 to N+1 length DCT-2;

outputting N+1 length DFT N+1 by transposing the N+1 length DCT-2; and performing N+1 length FFT on the N+1 length DFT.

3. The method of claim 1, wherein the performing applying the inverse-transform of the DCT-5 comprises:

performing one multiplication and (N−1) times of addition operations on DCT-6 transform kernel;

performing (2N−1) length Winograd FFT; and outputting DCT-5 transform kernel by performing N times of multiplication operations.

4. The method of claim 1, wherein the transform combination index is transmitted in each transform unit.

5. An apparatus for processing a video signal using a linear relationship between transform types, comprising:

a memory configured for storing the video signal; and a processor coupled to the memory;

wherein the processor is configured for:

parsing a transform combination index from the video signal, wherein the transform combination index indicates one of a plurality of transform combinations in the transform group;

determining a transform group based on a prediction of a current block, deriving a transform combination corresponding to the transform combination index, performing an inverse-transform on the current block based on the transform combination; and reconstructing the video signal by using the inverse-transformed current block, wherein the transform combination is composed of a horizontal transform and a vertical transform, and includes DST-1 or DCT-5, and wherein the processor is configured for applying an inverse transform of the DST-1 or an inverse transform of the DCT-5 on each row when the vertical transform is DST-1 or DCT-5, and applying an inverse-transform of DST-1 or an inverse-transform of DST-5 to each column when the horizontal transform is DST-1 or DCT-5.

6. The apparatus of claim 5, wherein, when applying the inverse transform of the DST-1, the processor performs a linear mapping on N length DST-1 to N+1 length DCT-2, outputs N+1 length DFT N+1 by transposing the N+1 length DCT-2, and performs N+1 length FFT on the N+1 length DFT.

7. The apparatus of claim 5, wherein, when applying the inverse transform of the DCT-5, the processor performs one multiplication and (N−1) times of addition operations on DCT-6 transform kernel, performs (2N−1) length Winograd FFT, and outputs DCT-5 transform kernel by performing N times of multiplication operations.

8. The apparatus of claim 5, wherein the transform combination index is transmitted in each transform unit.

* * * * *